(12) United States Patent
Okura et al.

(10) Patent No.: US 7,194,403 B2
(45) Date of Patent: Mar. 20, 2007

(54) APPARATUS, METHOD, AND COMPUTER-READABLE MEDIUM FOR LANGUAGE TRANSLATION

(75) Inventors: Seiji Okura, Kawasaki (JP); Akira Ushioda, Kawasaki (JP); Masaru Fuji, Kawasaki (JP); Tatsuo Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 927 days.

(21) Appl. No.: 09/964,649

(22) Filed: Sep. 28, 2001

(65) Prior Publication Data

US 2002/0138250 A1 Sep. 26, 2002

(30) Foreign Application Priority Data

Mar. 19, 2001 (JP) ............... 2001-078386

(51) Int. Cl.
*G06F 17/28* (2006.01)
*G06F 17/20* (2006.01)
*G06F 17/27* (2006.01)
*G06F 17/21* (2006.01)

(52) U.S. Cl. ............... 704/7; 704/4; 704/9; 704/10

(58) Field of Classification Search ............... 704/10, 704/2, 7, 4, 9
See application file for complete search history.

(56) References Cited

U.S. PATENT DOCUMENTS

| | | | | |
|---|---|---|---|---|
| 5,289,375 A | * | 2/1994 | Fukumochi et al. | 704/2 |
| 5,826,219 A | * | 10/1998 | Kutsumi | 704/4 |
| 5,826,220 A | * | 10/1998 | Takeda et al. | 704/7 |
| 5,873,055 A | * | 2/1999 | Okunishi | 704/2 |
| 6,278,969 B1 | * | 8/2001 | King et al. | 704/7 |
| 6,285,978 B1 | * | 9/2001 | Bernth et al. | 704/7 |
| 6,345,244 B1 | * | 2/2002 | Clark | 704/2 |
| 6,345,245 B1 | * | 2/2002 | Sugiyama et al. | 704/10 |
| 6,535,842 B1 | * | 3/2003 | Roche et al. | 704/7 |

FOREIGN PATENT DOCUMENTS

| | | | |
|---|---|---|---|
| JP | 09-134358 | * | 5/1997 |
| JP | 09-026961 | * | 8/1997 |
| JP | 11-325103 | * | 5/2001 |

OTHER PUBLICATIONS

Hajic, Jan, Hric, Jan, and Vladislav Kubon. Machine translation of very close language. Applied Natural Language Conferences, Proceedings of the sixth conference on Applied natural language processing, Seattle WA, Apr. 2000, pp. 7-12.*
Webb, Lynn. Advantages and disadvantages of trnaslation memory: a cost/benefit analysis.□□1998. Masters Thesis, Monterey Institute of International Studies, Monterey CA.*

* cited by examiner

*Primary Examiner*—Richemond Dorvil
*Assistant Examiner*—Thomas E. Shortledge
(74) *Attorney, Agent, or Firm*—Staas & Halsey LLP

(57) ABSTRACT

An interface unit issues input/output instructions regarding an input of a translation target sentence, an output of a translated sentence, and a translation control. A machine translating apparatus translates a document in a certain language into a document in another language. A translation memory device translates a sentence by searching an original/translation database in which sentences in a certain language and original/translation sentences in another language corresponding thereto have been accumulated. A data compatible processing unit makes original/translation information translated by the machine translating apparatus and original/translation information translated by the translation memory device common, thereby enabling them to be fetched mutually as original/translation information.

12 Claims, 27 Drawing Sheets

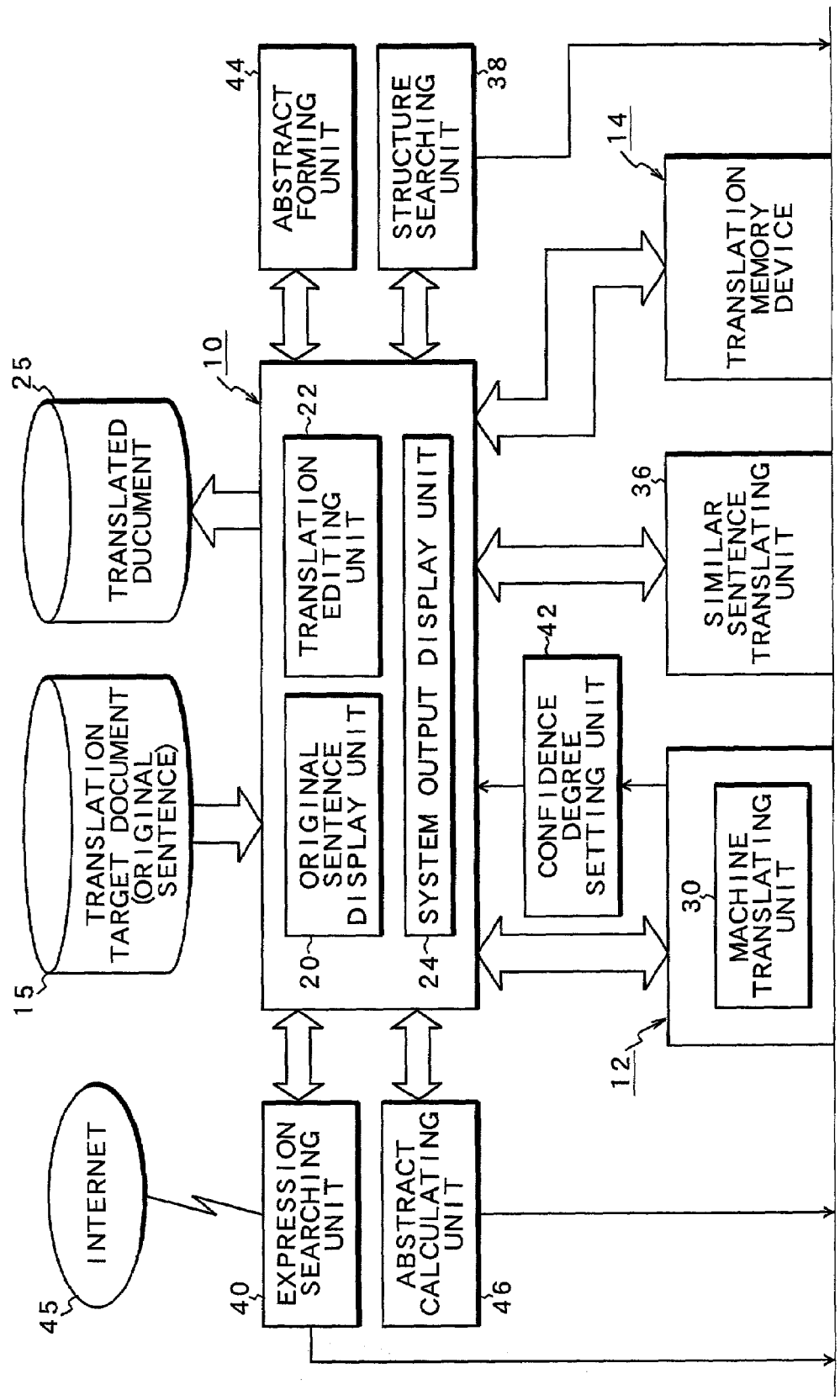

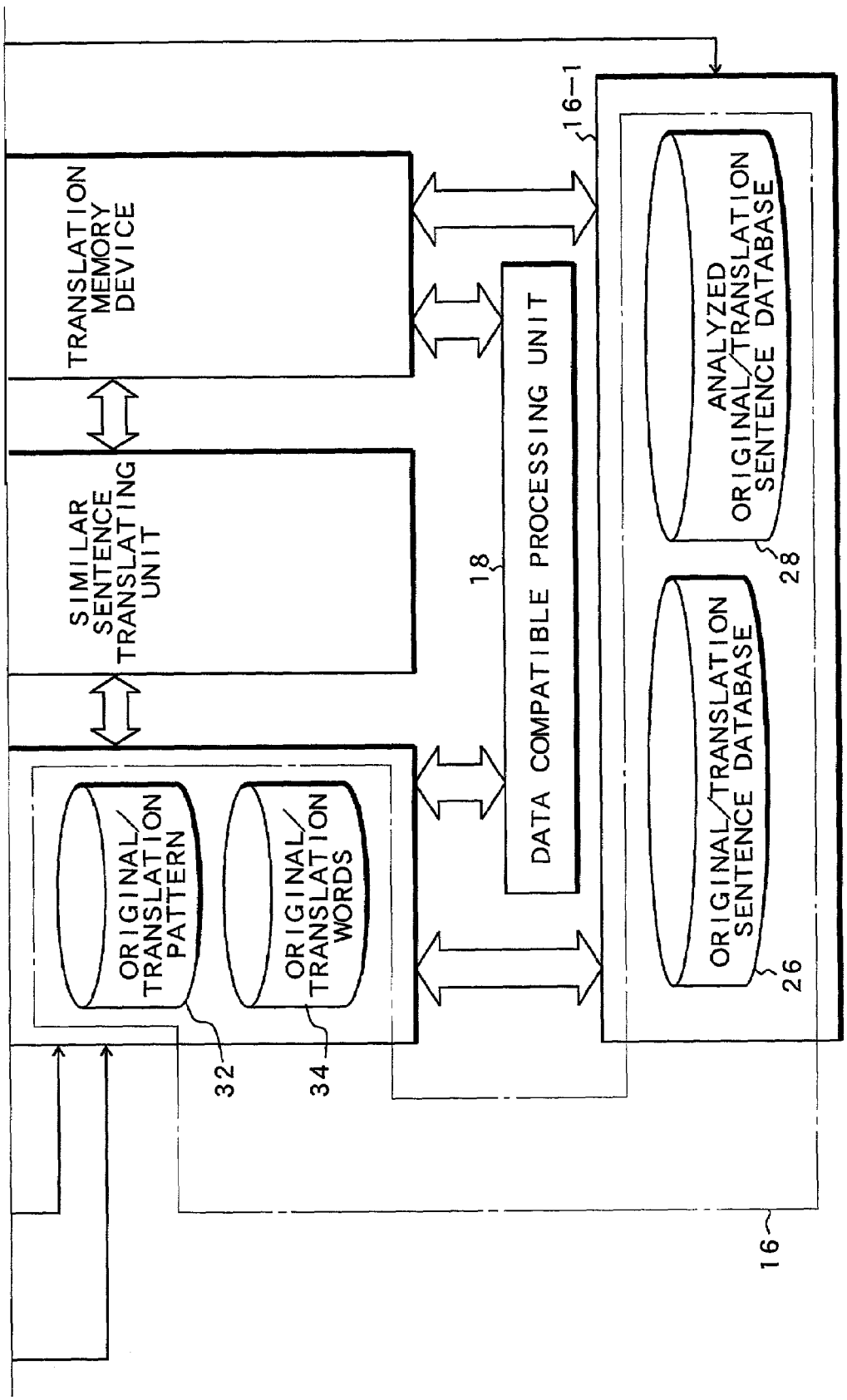

FIG. 3A

```
┌─────────────────────────────────────────────────────────────┐
11→│                                                             │
   │  FILE(F)   EDIT(E)   VIEW(V)   FAVORITES(A)   TOOLS(T)   HELP(H)
   │   □       □       □       □       □       □       □
   │  BACK   FORWARD  STOP   REFRESH  HOME   SEARCH  FAVORITES  HISTORY
   │
   │  ADDRESS(D) [                                          ]
```

22 — 物凄い新しい挑戦と機会を提示して、インターネットの急速な拡大は世界中で個々のライフスタイルとビジネスの行為を劇的に変えている。

| TRANSLATE | TM | MT | SS | WORD | OVERWRITE |

We are determined to help our customers succeed in this dynamic new era by focusing squarely on their needs, and by leveraging our technological strengths, highly reliable products and services, and global expertise in systems and services to deliver solutions that unleash the infinite possibilities of the Internet.

| TRANSLATE | TM | MT | SS | WORD | OVERWRITE |

Welcome to Fujitsu Limited.

| TRANSLATE | TM | MT | SS | WORD | OVERWRITE |

24-2 —
RANK 1. SCORE 25

SENTENCE TO BE TRANSLATED

We are determined to help our customers succeed in this dynamic new era by focusing squarely on their needs, and by leveraging our technological strengths, highly reliable products and services, and global expertise in systems and services to deliver solutions that unleash the infinite possibilities of the Internet.

SIMILAR SENTENCE

ESENT:The Web sites...(for[6]) your (server[7]).

ORIGINAL/TRANSLATION SENTENCE
　次に（記載[0]）するWebサイトは（サーバ[7]）（用の[6]）（製品[4]）と（サービス[5]）...

FIG. 3B

☐ ☐ ☐ ☐ ☐
MAIL  PRINT  EDIT  SUBJECT  RealGuide

GO  LINKS

THE POSSIBILITIES ARE INFINITE

物凄い新しい挑戦と機会を提示して、インターネットの急速な拡大は世界中で個々のライフスタイルとビジネスの行為を劇的に変えている。We are determined to help our customers succeed in this dynamic new era by focusing squarely on their needs, and by leveraging our technological strengths, highly reliable products and services, and global expertise in systems and services to deliver solutions that unleash the infinite possibilities of the Internet.

| SENTENCE NO. | ORIGINAL SENTENCE | TRANSLATED SENTENCE |
|---|---|---|
|  | We are determined to help our customers succeed in this dynamic new era by focusing squarely on their needs, and by leveraging our technological strengths, highly reliable products and services, and global expertise in systems and services to deliver solutions that unleash the | 我々は直角に彼らの必要性に焦点を合わせ、我々の技術的な強度、高信頼性製品およびサービスを投機することによって我々の顧客がこのダイナミックな新しい時代で成功するのを助けると決心している。そして、システムにおけるグローバルな専門的技術とそれを解 |

24-1

INTRANET

FIG. 3C

35 focus on the needs <--> ニーズに注目する
deliver solutions<--> 解決策を提供する
infinite possibilities<--> 無限の可能性

XXXXX is a registered trademark and YYYYY is a trademark of ZZZZZ Corporation.

50

XXXXX は XXXXX Corporation の登録商標です。YYYYY は ZZZZZ Corporation の商標です。

```
<GENBUN SENTENCE="1">
XXXXX is a registered trademark and YYYYY is a trademark of XXXXX Corporation.
</GENBUN>

<MOR_ANALYSIS SENTENCE="1">
XXXXX F[2] o[XXXX] |[1,1]
is F[1]o[is]|[2,1]
a F[2101]o[a]|[3,1]
registered trademark F[0]o[registered trademark]|[4,1]
and F[50011]o[and]|[5,1]
  ..
</MOR_ANALYSIS>

<SYN_ANALYSIS SENTENCE="1">
<ROOT category="SENTENCE" start="1" end="12">
  ..
  <NT category="_S" start="1" end="11">
    <T category="N.PR" start="1" end="1">
      <HYOUKI>XXXXX</HYOUKI>
      <DIC>?N. XXXXX</DIC>
    </T>
  </NT>
  <NT category="_VP" start="2" end="4">
    <NT category="_BE" start="2" end="2">
</SYN_ANALYSIS>
```

70: ([0]) is a registered trademark and ([2]) is a trademark of ([3]).

72: ([0]) は ([3]) の登録商標です。([2]) は ([3]) の商標です。

68

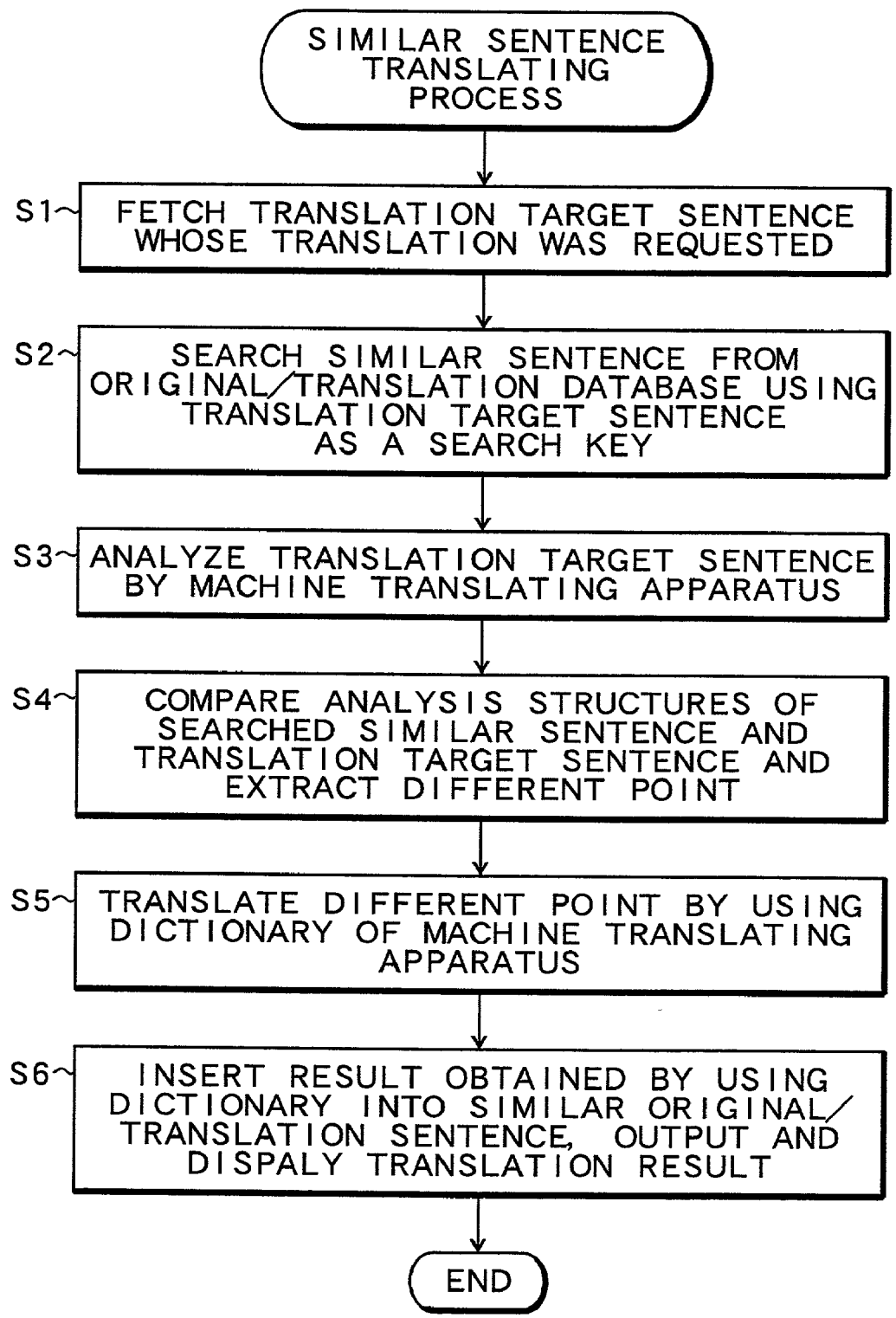

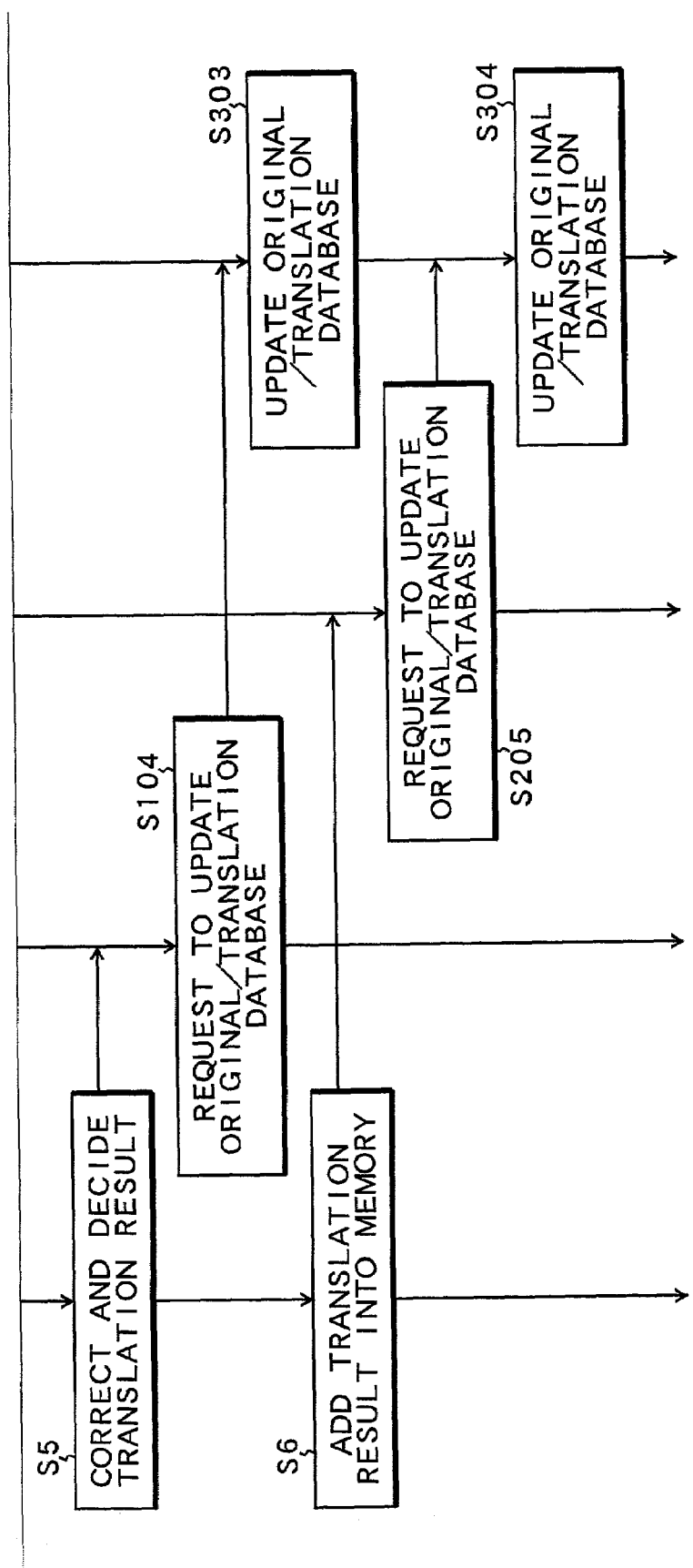

FIG. 15

88 TRANSLATION TARGET SENTENCE:
Thunderbird is a registered trademark and @thunder is a trademark of USLKX.

90 OUTPUT OF TRANSLATION SUPPORTING APPARATUS:

92 → MT (100%) Thunderbird は USLKX の登録商標です。@thunder は USLKX の商標です。
94 → TM (78%) XXXXX is a registered trademark and YYYYY is a trademark of XXXXX Corporation.
XXXXX は XXXXX Corporation の登録商標です。YYYYY は XXXXX Corporation の商標です。
96 → TM (42%) Thunderbird is used by the XXXXX Corporation.
Thunderbird は XXXXX Corporation により使用される登録商標です。

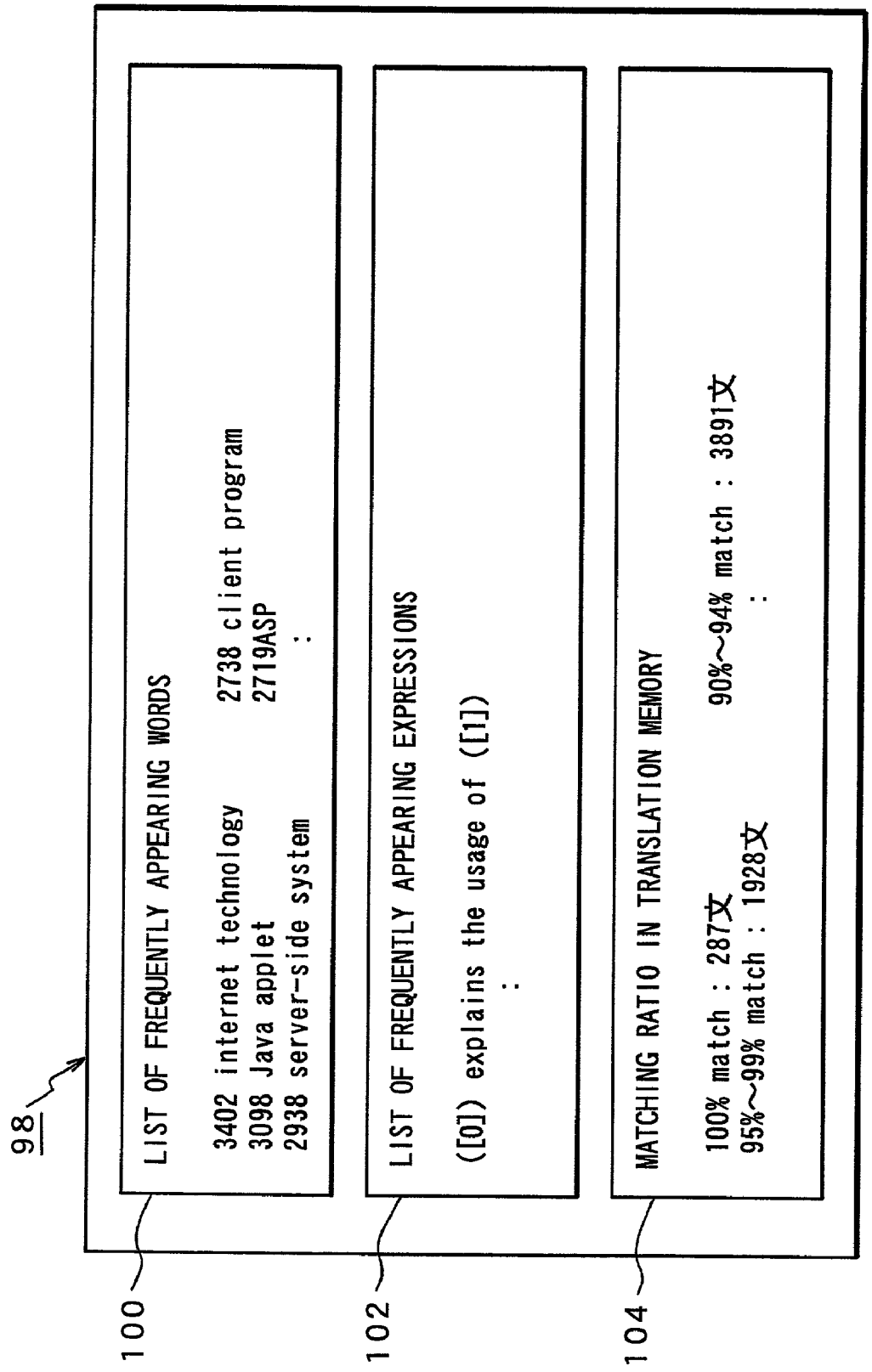

FIG. 18B

REFRESH

```
src="About%20Fujitsu%20-%20fujitsu_com.files/spacer.gif
" width=1></TD></TR>
    <TR>
       <TD width=10><IMG border=0 height=1 src="About%20Fujitsu%20-%20fujitsu_com.files/spacer.gif
" width=1></TD>
       <TD vAlign=top width=470><FONT face=Arial
size=3>
<t1> Welcome to Fujitsu Limited. </t1>
<t2> Around                             for
advanced tec
reliability.
       <P>
<t3>Fujitsu                                    trillion
yen($49.6 billion)in the fiscal year ended March 31.
2000.</t3>
<t4>Fujitsu's pace-setting technologies.world-class
computing and telecommunications platforms,and global
corps of over 60,000 systems and services experts
make it uniquely positioned to harness the power of the
Internet to help its customers succeed.</t4>
 <BR></FONT></P></TD></TR></TBODY></TABLE></TD>
</TR></TBODY></TABLE>
<TABLE border=0 cellPadding=0 cellSpacing=0
height="20% width="100%">
  <TBODY>
   <TR>
    <TD vAlign=top width=150><IMG border=0 height=1 src="About%20Fujitsu%20-%20fujitsu_com.files/spacer.gif
" width=150></TD>
     <TD bgColor=#585858 width=1><IMG border=0
height=1
```

126

122

128

100%: ようこそ富士通へ

70%: いらっしゃい富士通へ

再翻訳

APPARATUS, METHOD, AND COMPUTER-READABLE MEDIUM FOR LANGUAGE TRANSLATION

BACKGROUND OF THE INVENTION

1. Field of the Invention

The invention relates to translation supporting apparatus and method and a translation supporting program for translating a document in a certain language into a document in another language. More particularly, the invention relates to translation supporting apparatus and method and a translation supporting program for translating by interlocking a machine translating apparatus with a translation memory device.

2. Description of the Related Arts

Hitherto, as translation supporting apparatuses for translating, for example, an English sentence into a Japanese sentence, a machine translating apparatus, a translation memory device, an electronic dictionary apparatus, an Internet words searching apparatus, an abstract forming apparatus, and the like have been known. The machine translating apparatus is a computer system for translating a certain language into another language. After making a syntax analysis for converting an order of words by paying attention to a grammatical structure of a translation target sentence, a meaning process for translating by considering a meaning of each word on the basis of information in the sentence, or the like is further executed. According to the machine translating apparatus, it is a present situation that a translation precision which is adequate for actual translating work cannot be obtained. However, if the translation is limited to a field in which typical sentence patterns or words appear frequently, a document of an amount which is much larger than an amount of document which can be processed by a human being can be translated by predetermined literary styles and translated words. Sentences and words like a table whose translation words have been predetermined can be efficiently translated at a high precision. The translation memory device accumulates original/translation sentences of translation target sentences and translated sentences into an original/translation sentence database, searches the original/translation sentence database by using the translation target sentence as a search key, and displays the original/translation sentence which coincides with the translation target sentence or the original/translation sentence close to it. The translation memory device is used in the actual translating work and contributes to the improvement of quality such as unity of the literary style and the translation words, or the like. However, translating efficiency is not improved very much. The electronic dictionary apparatus is a supporting apparatus for searching words or their use examples from a CD-ROM or a homepage of the Internet in order to improve efficiency of work for looking up a dictionary. The Internet words searching apparatus is a search engine or the like and is a supporting apparatus for searching a document or the like including a word from a homepage of the Internet by using such a word as a search key. The abstract forming apparatus forms an abstract of a document as a target when a large amount of translating work is done. By obtaining the abstract, the translation can be made easy.

However, in such conventional translation supporting apparatuses, the apparatuses such as machine translating apparatus, translation memory device, electronic dictionary apparatus, Internet words searching apparatus, and abstract forming apparatus exist separately. Even if they are combined and the translating work is executed, sufficient efficiency of the translating work cannot be realized for the following reasons. First, unless the translation words searched from the electronic dictionary apparatus or Internet words searching apparatus are registered as a dictionary into the machine translating apparatus, they cannot be used for a machine translation. There is a problem such that it takes much labor and time for registering them into the dictionary. According to the translation memory device, a large amount of original/translation sentences are accumulated into the original/translation database and used for search. However, original/translation sentence information accumulated into the original/translation sentence database cannot be taken in as it is because its data format is different from each other, so that it cannot be used by the machine translating apparatus. According to the translation memory device, the translation target sentence is used as a search key and only the matching of a surface layer level can be obtained between the translation target sentence and the original/translation sentence of the original/translation database. Therefore, the original/translation sentence to be inherently searched in consideration of a syntax is buried. Further, since the translation memory device is a mere search system, for example, even in case of a sentence in which one word is wrong and which can be translated if such a wrong word is automatically changed, a search result has to be manually corrected.

SUMMARY OF THE INVENTION

According to the invention, there are provided translation supporting apparatus and method and a translation supporting program, in which automatization of translating work is advanced by interlocking a machine translating apparatus with a translation memory device, working efficiency is raised, and translation quality is improved.

According to the invention, there is provided a translation supporting apparatus comprising: an interface unit which issues input and output instructions regarding an input of a translation target document, an output of a translated document, and a translation control; a machine translating apparatus which translates a document in a certain language into a document in another language; an original/translation database in which original/translation information has been accumulated; a translation memory device which supports work for translating a document in a certain language into a document in another language by searching the original/translation database; and a data compatible processing unit which makes the original/translation information translated by the machine translating apparatus and the original/translation information translated by the translation memory device common and enables those information to be mutually fetched as original/translation information. The original/translation database has: an original/translation sentence database which is used by the translation memory device; an analyzed original/translation sentence database in which original/translation sentences have been analyzed by a morpheme analysis or a syntax analysis; and a dictionary in which original/translation words and original/translation patterns which are used by the machine translating apparatus have been registered. The data compatible processing unit adds the original/translation sentences obtained by the machine translating apparatus or sentences obtained by correcting the original/translation sentences obtained by the translation memory device into the original/translation sentence database, adds the original/translation sentences obtained by the translation memory device or original/ translation sentences translated by the user into the original/translation sentence database, adds analyzed original/translation sentences obtained by analyzing the original/translation sentences into the analyzed original/translation sentence database, further extracts the original/translation words or original/translation patterns from the analyzed original/translation sentences, and adds them into a dictionary on the machine translating apparatus side. Thus, the original/translation information obtained by the machine translating apparatus is reflected to the search database which is used by the translation memory device and, at the same time, the original/translation information accumulated in the search database of the translation memory device is reflected to the dictionary of the machine translating apparatus. Since each original/translation information can be used as common resources, the automatization of the translating work is further progressed. The improvement of the working efficiency and the translation quality is expected. The data compatible processing unit adds confidence degrees to original/translation word candidates or original/translation pattern candidates which were automatically extracted from the analyzed original/translation sentences in the original/translation database and allows the candidates with the confidence degrees to be displayed. Thus, the user can determine whether the candidates of lower confidence degrees should be registered into the dictionary or not. Only the candidates of high confidence degrees can be automatically registered into the dictionary, thereby preventing the wrong original/translation words or original/translation patterns from being registered into the machine translating apparatus.

The translation supporting apparatus of the invention further has a similar sentence translating unit. When the translation memory device is requested to translate, the similar sentence translating unit searches similar sentences by searching the original/translation database on the basis of an input sentence, sends the input sentence to the machine translating apparatus, obtains an analysis result, compares a search result of the original/translation database with the analysis result obtained from the machine translating apparatus, sends different input words to the machine translating apparatus, obtains original/translation words, and replaces the different words of original/translation similar sentences with the obtained original/translation words. Therefore, when the similar sentences are searched from the original/translation database, the different words are automatically translated by interlocking with the machine translating apparatus. There is no need to artificially correct errors of the words of the original/translation sentence obtained from the translation memory device. The translation supporting apparatus of the invention further has a structure searching unit. The structure searching unit sends a search input sentence of the translation memory device to the machine translating apparatus via the data compatible processing unit, obtains an analysis result, searches original/translation sentences having similar structures from the analyzed original/translation sentence database by using the analysis result as a search key, and allows them to be displayed. Therefore, upon searching of the original/translation database, the original/translation sentences having the similar structure can be also searched instead of the surface-layer-like matching of the translation target sentence. The translation supporting apparatus of the invention further has an expression searching unit which searches examples of the actual use of a designated word and displays them. Therefore, if the correct original/translation words cannot be found either by the machine translating apparatus or the translation memory device, by searching and displaying examples of sentences including those words, the translating efficiency is improved. The translation supporting apparatus of the invention further has a confidence degree setting unit. When a sentence is simultaneously translated by the translation memory device and the machine translating apparatus, with respect to an output display of translation candidates added with marks indicative of the confidence degrees from the translation memory device, the confidence degree setting unit adds marks indicative of confidence degrees to translated sentence candidates outputted from the machine translating apparatus and allows the candidates with the marks to be displayed. Although the translation memory device adds the confidence degrees to the translation candidates and displays the candidates with the confidence degrees, in case of the machine translating apparatus, since the confidence degrees of the translation candidates are not displayed, by adding the confidence degrees thereto and simultaneously displaying them, the correct translation result of the high confidence degree can be instantaneously distinguished from the translation candidates of the translation memory device and the machine translating apparatus. The translation supporting apparatus of the invention further has an outline forming unit for displaying an abstract of the translation target document before translation. Therefore, in a large amount of translating work, an abstract is formed from the translation target document. By translating this abstract, the subsequent translating work can be predicted and the translation is made easy. The translation supporting apparatus of the invention further has an outline calculating unit which calculates document information including the number of characters, the number of words, expressions, and the like of the translation target document and allows them to be displayed in order of appearance frequencies. Since such document information regarding the translation target sentence is automatically displayed, to which words or expressions attention should be preliminarily paid in order to translate the sentence can be soon recognized. In the translation supporting apparatus of the invention, the interface unit comprises: an original sentence display unit which displays a translation target sentence; a system output display unit which displays a translated sentence; and a translation editing unit which issues an editing instruction including a machine translation, a translation memory search, a structure search, and a word search.

The interface unit is displayed as a translating work picture plane to the user and the original sentence, the translated sentence, and an editing tool are displayed on the same picture plane, so that the translating work in which the machine translating apparatus is interlocked with the translation memory device can be efficiently performed.

According to the present invention, a translation supporting method is provided. This translation supporting method comprises the steps of: translating a document in a certain language into a document in another language by a machine translating apparatus; translating a document in a certain language into a document in another language by a translation memory device by searching an original/translation database in which original/translation information has been accumulated; and making the original/translation information translated by the machine translating apparatus and the original/translation information translated by the translation memory device common so that data is compatible and mutually fetching those information as original/translation information. According to the translation supporting method, the original/translation database has: an original/translation sentence database which is used by the translation memory device; an analyzed original/translation sentence database in which original/translation sentences have been analyzed by a morpheme analysis, a syntax analysis, or the like; and a dictionary in which original/translation words and original/translation patterns which are used by the machine translating apparatus have been registered. The original/translation sentences obtained by the machine translating apparatus or sentences obtained by correcting the original/translation sentences obtained by the translation memory device are converted into compatible data and added into the original/translation sentence database. The original/translation sentences obtained by the translation memory device or original/translation sentences translated by the user are added into the original/translation sentence database. Analyzed original/translation sentences obtained by analyzing the original/translation sentences are added into the analyzed original/translation sentence database. Further, the original/translation words or original/translation patterns are extracted from the analyzed original/translation sentences and added into a dictionary of the machine translating apparatus. According to the translation supporting method, confidence degrees are added to original/translation word candidates or original/translation pattern candidates which were automatically extracted from the analyzed original/translation sentences and the candidates with the confidence degrees are displayed. According to the translation supporting method, there is further executed a similar sentence translation such that when the translation memory device is requested to translate, similar sentences are searched by searching the original/translation database on the basis of an input sentence, the input sentence is sent to the machine translating apparatus, an analysis result is obtained, a search result of the original/translation database is compared with an analysis result obtained from the machine translating apparatus, different input words are sent to the machine translating apparatus, original/translation words are obtained, and the different words of original/translation similar sentences are replaced with the obtained original/translation words. According to the translation supporting method, further, the search input sentence of the translation memory device is sent to the machine translating apparatus via a data compatible processing unit, an analysis result is obtained, original/translation sentences having similar structures are searched from the analyzed original/translation sentence database by using the analysis result as a search key, and they are displayed. According to the translation supporting method, further, examples of the actual use of a designated word are searched and displayed. According to the translation supporting method, further, when a sentence is simultaneously translated by the translation memory device and the machine translating apparatus, with respect to an output display of translation candidates added with marks indicative of confidence degrees from the translation memory device, marks indicative of confidence degrees are added to the translated sentence candidates outputted from the machine translating apparatus and the candidates with the marks are displayed. According to the translation supporting method, further, an abstract showing an outline of the translation target document is displayed before translation. According to the translation supporting method, further, document information including the number of characters, the number of words, and expressions of a translation target document is calculated and they are displayed in order of appearance frequencies. According to the translation supporting method, in an interface unit, a translation target sentence is displayed on an original sentence display unit, the translated sentence is displayed on a system output display unit, and an editing instruction including a machine translation, a translation memory search, a structure search, and a word search is issued from a translation editing unit.

According to the invention, a translation supporting program is provided. This translation supporting program allows a computer to execute the steps of: translating a document in a certain language into a document in another language by a machine translating apparatus; translating a document in a certain language into a document in another language by a translation memory device by searching an original/translation database in which original/translation information has been accumulated; and making the original/translation information translated by the machine translating apparatus and the original/translation information translated by the translation memory device common so that data is compatible and mutually fetching those information as original/translation information. The details of the translation supporting program are fundamentally the same as those of the translation supporting method.

The above and other objects, features, and advantages of the present invention will become more apparent from the following detailed description with reference to the drawings.

BRIEF DESCRIPTION OF THE DRAWINGS

FIGS. 1A and 1B are block diagrams of a functional construction according to an embodiment of the invention;

FIGS. 3A to 3C are explanatory diagrams of a picture plane during the translating work using FIGS. 2A and 2B;

FIG. 5 is an explanatory diagram of an original/translation sentence which is accumulated into an original/translation database;

FIG. 6 is an explanatory diagram of a translation target sentence with analysis information which is accumulated into the original/translation database;

FIG. 8 is an explanatory diagram of an original/translation pattern which is added into the dictionary of the machine translating apparatus;

FIG. 11 is a flowchart for a similar sentence translating process of the invention;

FIGS. 12A to 12C are time charts for the processing operation in a range from the translation to the updating of the original/translation database in the case where the translation is simultaneously executed by the machine translating apparatus and a translation memory device in the invention;

FIG. 15 is an explanatory diagram in the case where confidence degrees are added to machine translation results by a confidence degree setting unit of the invention and they are displayed simultaneously with translation results with confidence degrees of the translation memory device;

FIG. 16 is an explanatory diagram of display contents regarding translation target documents by an outline calculating unit of the invention;

FIGS. 18A to 18C are explanatory diagrams of a picture plane during the translating work using FIGS. 17A and 17B.

DETAILED DESCRIPTION OF THE PREFERRED EMBODIMENT

Figure 2A:
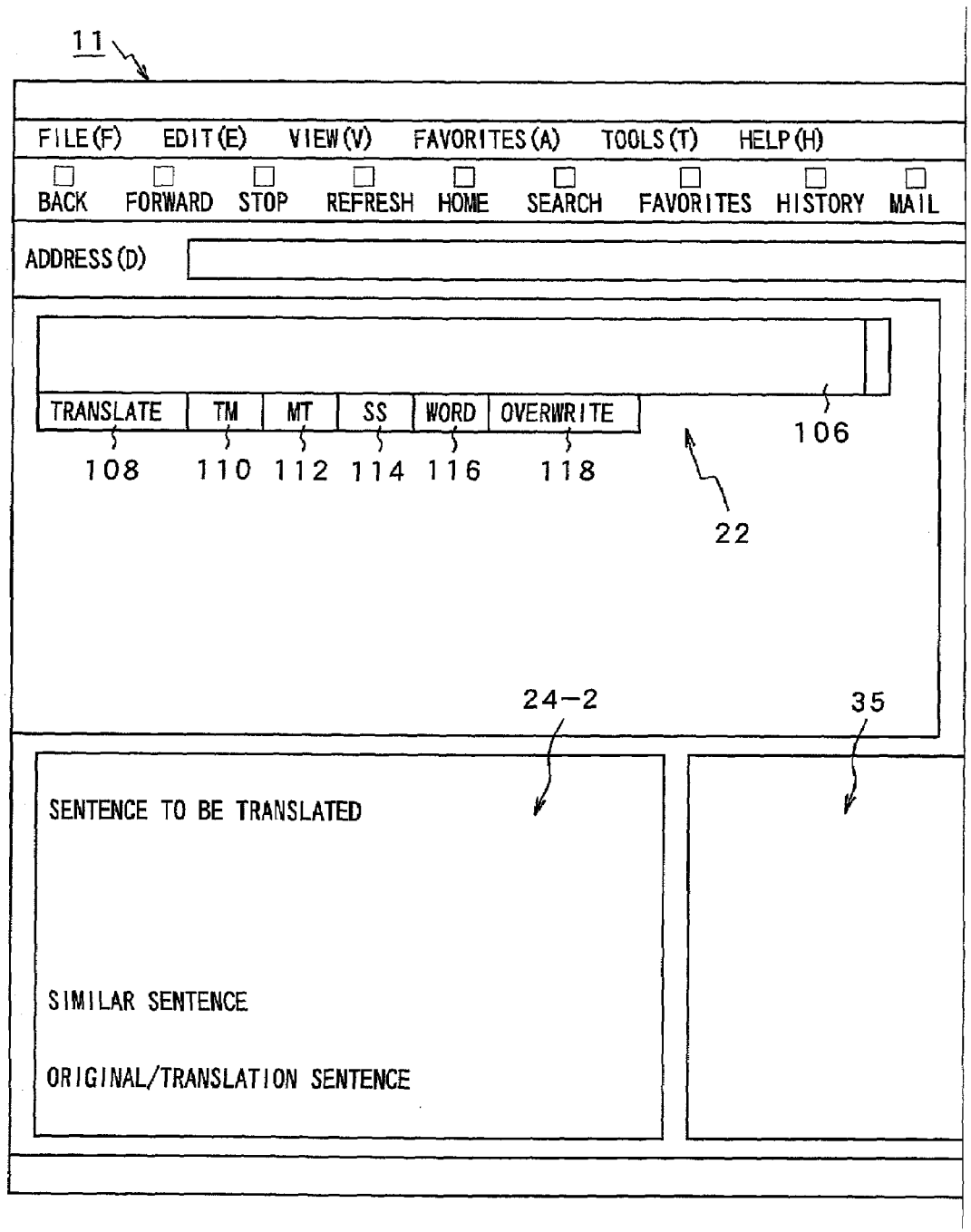
FIGS. 2A and 2B are explanatory diagrams of a translating work picture plane which is provided by an interface unit of the invention.

FIGS. 1A and 1B are block diagrams of a functional construction of a translation supporting apparatus of the invention. A fundamental construction of the translation supporting apparatus of the invention is constructed by: an interface unit 10; a machine translating apparatus 12; a translation memory device 14; an original/translation database 16; a data compatible processing unit 18; and a similar sentence translating unit 36. In addition to them, in the translation supporting apparatus of the invention, in order to further enhance a supporting function, a structure searching unit 38, an expression searching unit 40, a confidence degree setting unit 42, an abstract forming unit 44, and an outline calculating unit 46 can be provided. The interface unit 10 has an original sentence display unit 20, a translation editing unit 22, and a system output display unit 24 and performs an input of a translation target document 15 and an output of a translation result to a translated document 25. For example, a translating work picture plane 11 as shown in FIGS. 2A and 2B is prepared as an interface unit 10.

Figure 2B:
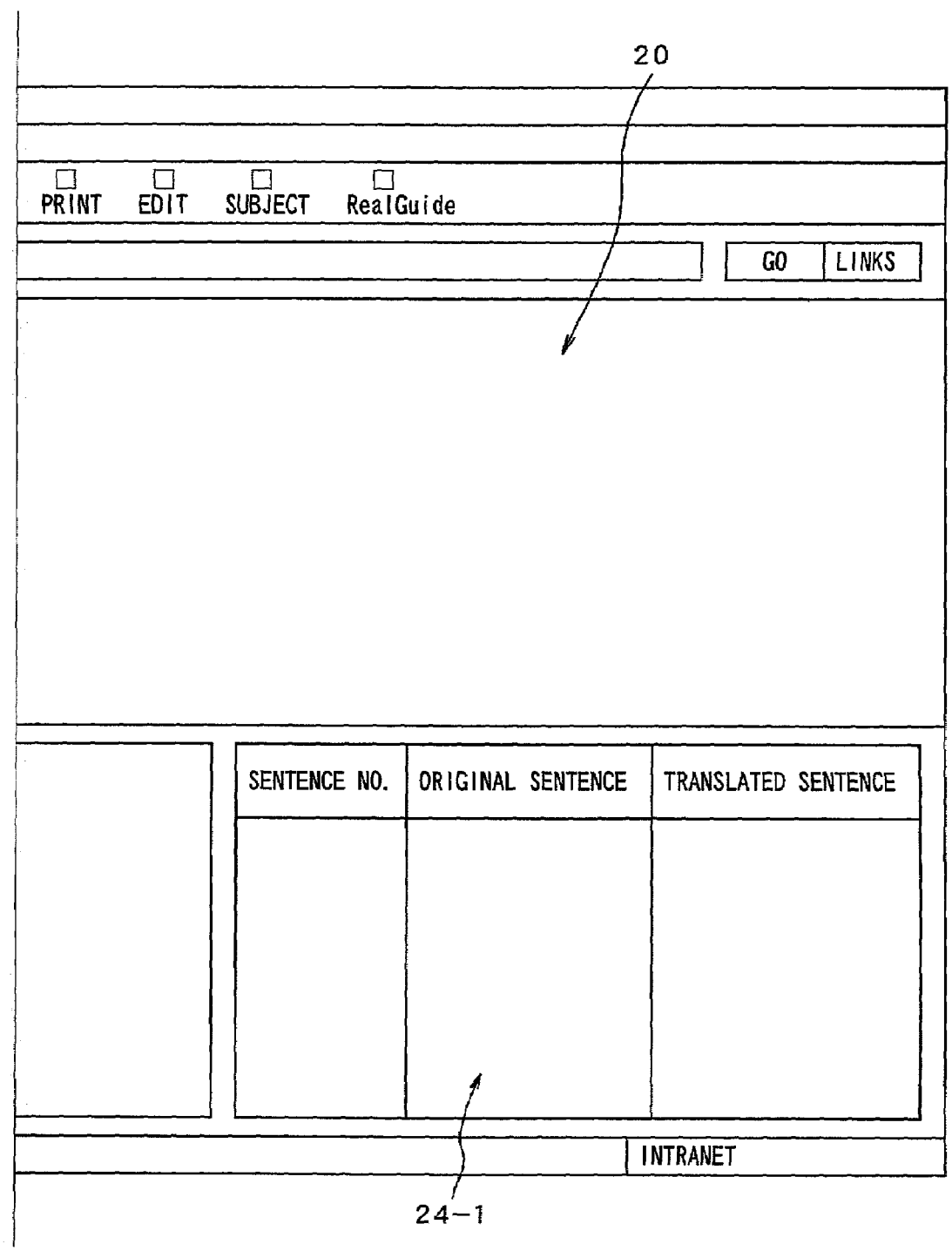

The translating work picture plane 11 in FIGS. 2A and 2B has the original sentence display unit 20, the translation editing unit 22, a machine translation display unit 24-1, a translation memory display unit 24-2, and an original/translation database matching sentence display unit 35. The translation target document 15 in FIGS. 1A and 1B is displayed on the original sentence display unit 20. An edition display area 106 is provided for the translation editing unit 22. A "translate" button 108, a "translation memory" button (TM button) 110, a "machine translate" button (MT button) 112, a "structure search" button (SS button) 114, a "word search" button (word button) 116, and an "overwrite" button 118 are provided under the area 106 as control buttons for instructing the translating operation by the user. When the translate button 108 among them is clicked, the same translating operation as the operation such that all of the translation memory button 110, machine translate button 112, structure search button 114, and word search button 116 have been operated is executed. An original sentence as a translation target sentence and a machine translated sentence are displayed on the machine translation display unit 24-1. A sentence to be translated, a similar sentence obtained by searching the original/translation database 16, and further, an original/translation sentence are displayed on the translation memory display unit 24-2. A plurality of candidates of the original/translation sentence matched by the search of the original/translation database 16 by the translation memory device 14 are displayed on the original/translation database matching sentence display unit 35. FIGS. 3A to 3C show an example of a display during the translating work using the translating work picture plane 11 in FIGS. 2A and 2B.

Referring to FIGS. 1A and 1B again, the machine translating apparatus 12 has a machine translating unit 30, an original/translation pattern dictionary 32, and an original/translation words dictionary 34. In response to a translating request from the I/F unit 10, the machine translating apparatus 12 fetches the translation target document 15, analyzes a syntax structure every target sentence, obtains an original/translation pattern and original/translation words by searching the original/translation pattern dictionary 32 and original/translation words dictionary 34, and further, forms an original/translation sentence by performing a meaning process. As a machine translating apparatus 12, it is realized by executing an independent machine translating program and, for example, "ATLAS" made by Fujitsu Ltd. or the like can be used. In response to a translating request by the user from the I/F unit 10, the translation memory device 14 extracts a target document from the translation target document 15, searches a search database 16-1 by using the target document as a search input sentence, and obtains an original/translation sentence close to a sentence in an original language of the translation target sentence. In a manner similar to the machine translating apparatus 12, the translation memory device 14 is also realized as an independent program and, for example, "Translators Workbench" made by TRADOS Co., Ltd. can be used. The original/translation database 16 includes: an original/translation sentence database 26; an analyzed original/translation sentence database 28 in the search database 16-1; and the original/translation pattern dictionary 32 and original/translation words dictionary 34 on the machine translating apparatus 12 side. Among them, the original/translation sentence database 26 and analyzed original/translation sentence database 28 are used as search memories of the translation memory device 14. Although the original/translation pattern dictionary 32 and original/translation words dictionary 34 provided for the machine translating apparatus 12 are used for the machine translation by the machine translating unit 30, by making data of the machine translating apparatus 12 and translation memory device 14 common through the data compatible processing unit 18, the original/translation pattern dictionary 32 and original/translation words dictionary 34 are also functionally included in the purview of the original/translation database 16 via the data compatible processing unit 18. The data compatible processing unit 18 makes the original/translation information obtained by the machine translating apparatus 12 and the original/translation information obtained by the translation memory device 14 common as a data of both of them, thereby constructing the original/translation database 16 so that the data can be used as original/translation information. That is, the data compatible processing unit 18 analyzes an original/translation sentence translated by the translation memory device 14 or an original/translation sentence translated by the user, adds it into the analyzed original/translation sentence database 28, further, extracts an original/translation pattern and original/translation words from the analyzed original/translation sentences, and adds them into the original/translation pattern dictionary 32 and original/translation words dictionary 34 on the machine translating apparatus 12 side. When a machine translation is performed by the machine translating apparatus 12 and the translation is determined through a correction or the like by the user, the data compatible processing unit 18 registers the determined original/translation sentence into the original/translation sentence database 26 and analyzed original/translation sentence database 28 and, at the same time, additionally registers the original/translation pattern and original/translation words into the original/translation pattern dictionary 32 and original/translation words dictionary 34. By reflecting the machine translation result and translation memory search result to each original/translation information by the data compatible processing unit 18 as mentioned above, the machine translating apparatus 12 can utilize the original/translation information accumulated in the translation memory device 14 and, at the same time, the translation result of the machine translating apparatus 12 can be utilized on the translation memory device 14 side. When the similar sentence translating unit 36 obtains the similar sentence by the search of the original/translation sentence database 26 responsive to the translating request to the translation memory device 14, the similar sentence translating unit 36 compares an analysis structure of the similar sentence with that of the search input sentence serving as a translation target sentence, extracts the different words, translates those words by using the machine translating apparatus 12, and replaces the different words of the original/translation sentence of the similar sentence, thereby obtaining the original/translation sentence. Therefore, even in the case where the original/translation result of the similar sentence in which one or a plurality of (small number of) words are different is obtained by the search of the original/ translation database 16 by the translation memory device 14, it is unnecessary that the user corrects the different portions in the original/translation result but they are automatically corrected and translated by interlocking with the machine translating apparatus 12, so that the translating efficiency of the translation memory device 14 can be remarkably improved. Further, the structure searching unit 38, expression searching unit 40, confidence degree setting unit 42, abstract forming unit 44, and outline calculating unit 46 provided in order to raise the translating function of the invention will now be simply described hereinbelow. The structure searching unit 38 analyzes a structure of the translation target sentence inputted by the I/F unit 10, searches an original/translation sentence having a structure close to such a structure from the original/translation database 16, and displays it. A search result by the structure searching unit 38 is displayed, for example, like a work picture plane of FIGS. 3A to 3C onto the original/translation database matching sentence display unit 35 of the translating work picture plane 11 in FIGS. 2A and 2B. The expression searching unit 40 searches examples of the actual use of the words or expressions from the original/translation pattern dictionary 32 and the original/translation words dictionary 34 of the machine translating apparatus 12 included as a functional construction in the original/translation database 16 of the translation supporting apparatus of the invention, and further, an Internet 45 as necessary and displays them onto the translating work picture plane as necessary. When a translating request for the same translation target document is issued from the I/F unit 10 to both of the machine translating apparatus 12 and translation memory device 14, in the translation memory device 14, the confidence degree setting unit 42 previously adds a confidence degree to the translation result of the machine translating apparatus 12 and the result is outputted and displayed. However, since the confidence degree is not displayed with respect to the translation result of the machine translating apparatus 12, a confidence degree is also added to the translation result of the machine translating apparatus 12 by the confidence degree setting unit 42. With respect to both of the translation result of the translation memory device 14 and the translation result of the machine translating apparatus 12, the confidence degrees are displayed by, for example, a percentage expression onto the work picture plane which is realized as an I/F unit 10, thereby allowing the user to discriminate which one of the translation results can be used. The abstract forming unit 44 is made operative in case of handling the large amount of translation target document 15, thereby forming an abstract document. By obtaining the translation result with respect to the abstract document which was automatically formed, the user can recognize a state of the subsequent translating work and can more easily progress the translating work. The outline calculating unit 46 calculates the numbers of appearance times of the words or expressions with respect to the translation target document 15 to be translated and displays them in the appearing order. It is also possible to calculate a matching ratio or the like of the translation target document to the original/translation database 16 and display it. Functions of the above processing units will be further clearly explained hereinlater.

Figure 4:
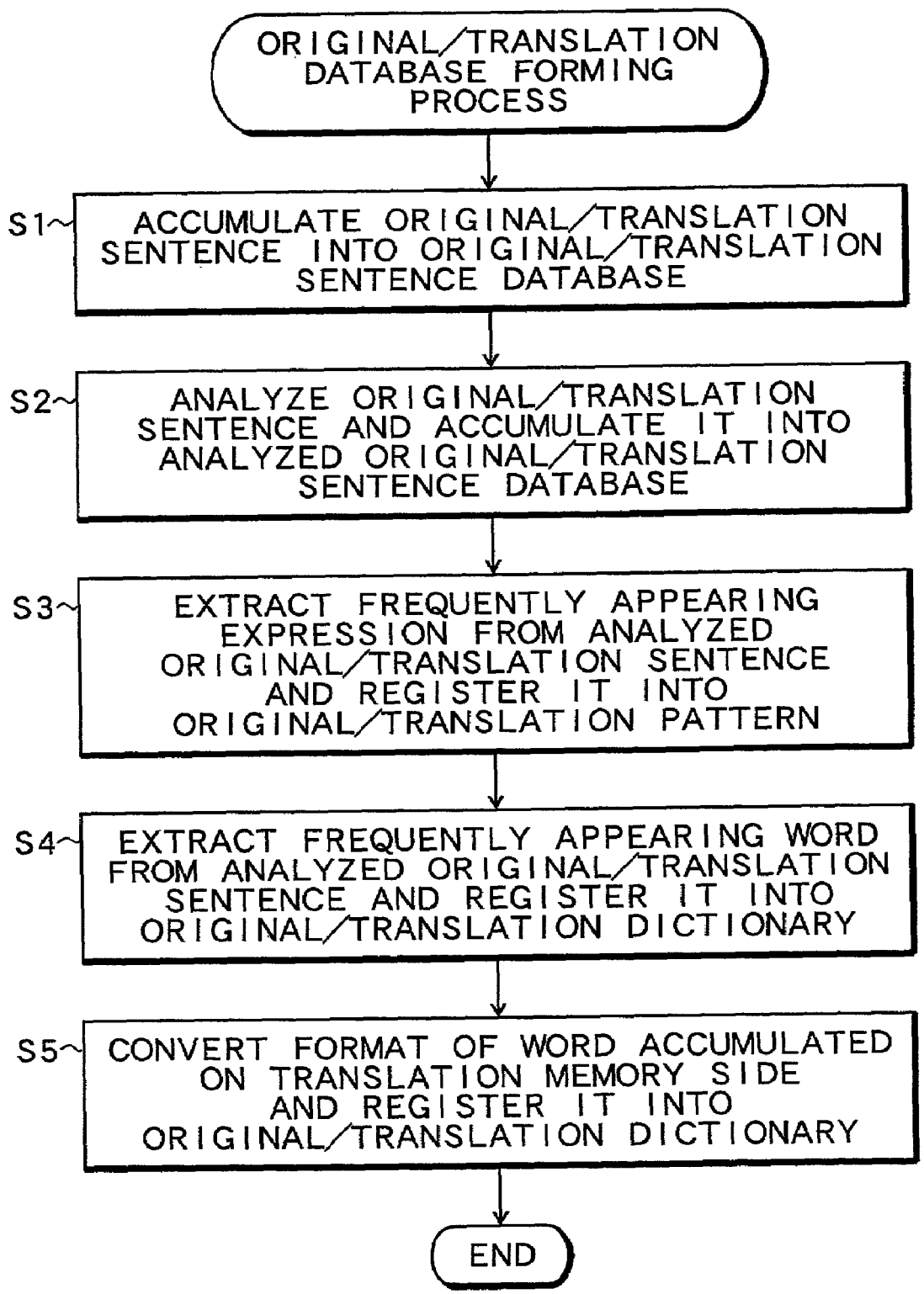
FIG. 4 is a flowchart for an original/translation database forming process in the invention.

FIG. 4 is a flowchart for the original/translation database forming process by the data compatible processing unit 18 in FIGS. 1A and 1B. The data compatible processing unit 18 first executes a process for accumulating the original/translation sentence into the original/translation database in step S1. Since no original/translation sentence is accumulated at the initial stage where the translation supporting apparatus of the invention has been activated, the original/translation sentence is extracted from the document 25 translated in the past and is accumulated into the original/translation sentence database 26. FIG. 5 shows an original/translation sentence record 48 which is accumulated into the original/translation sentence database 26. The record 48 is constructed by a combination of a translation target sentence 50 and its original/translation sentence 52.

Referring again to FIG. 4, after completion of the accumulation of the extracted original/translation sentence into the original/translation sentence database 26, in step S2, the original/translation sentence is sent to the machine translating apparatus 12, its structure is analyzed, and an analysis result is accumulated into the analyzed original/translation sentence database 28. As an analyzed original/translation sentence, a translation target sentence 54 with analysis information in FIG. 6 obtained by an analysis of a structure of the translation target sentence 50 in FIG. 5 is registered into the analyzed original/translation sentence database 28. There is a link relation between the translation target sentence with the analysis information registered in the analyzed original/translation sentence database 28 and a corresponding original/translation sentence record in the original/translation sentence database 26. Subsequently, in step S3 in FIG. 4, an expression which frequently appears is extracted from the analyzed original/translation sentence in the analyzed original/translation sentence database 28, the user finally discriminates whether the decided expression is registered or not, and thereafter, the decided expression is registered into the original/translation pattern dictionary 32. In step S4, an expression which frequently appears is similarly extracted from the analyzed original/translation sentence, the user makes a final decision, and thereafter, the decided words are registered into the original/translation words dictionary 34.

Further, if the original/translation sentences have already been accumulated into the original/translation sentence database 26 by the translation memory device 14, a process for converting a format of Japanese accumulated in the original/translation sentence database 26 and registering the converted Japanese words into the original/translation pattern dictionary 32 and original/translation words dictionary 34 is executed in step S5.

In the forming process of the original/translation database 16 by the data compatible processing unit 18 as mentioned above, as well as at timing when the translation supporting apparatus of the invention is activated, each time the translation result is determined by the machine translating apparatus 12 or each time the translation result is determined likewise by the translation memory device 14, the obtained original/translation sentence is registered as a target, that is, the registration of it into the original/translation sentence database 26, the registration into the analyzed original/translation sentence database 28, the registration into the original/translation pattern dictionary 32, and further, the registration into the original/translation words dictionary 34 are dynamically executed.

Figure 7A:
FIGS. 7A and 7B are explanatory diagrams of original/translation words which are added into a dictionary of a machine translating apparatus.
Figure 7B:
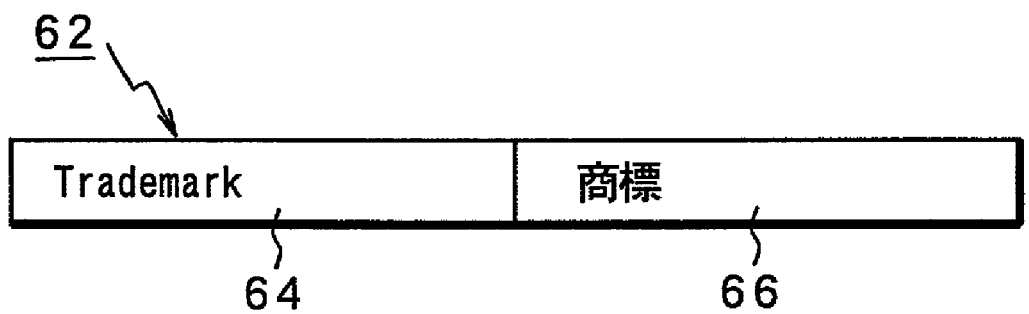

FIGS. 7A and 7B show examples of the original/translation words extracted on the basis of the translation target sentence 54 with analysis information in FIG. 6. Original/translation words 56 in FIG. 7A and an original/translation word 62 in FIG. 7B are extracted in this case and registered into the original/translation words dictionary 34 on the machine translating apparatus 12 side.

FIG. 8 shows an original/translation pattern extracted from the original/translation sentence record 48 in FIG. 5 and the translation target sentence 54 with analysis information in FIG. 6. An original/translation pattern record 68 comprising a combination of a translation target pattern 70 and an original/translation pattern 72 corresponding thereto is registered into the original/translation pattern dictionary 32.

Figure 9A:
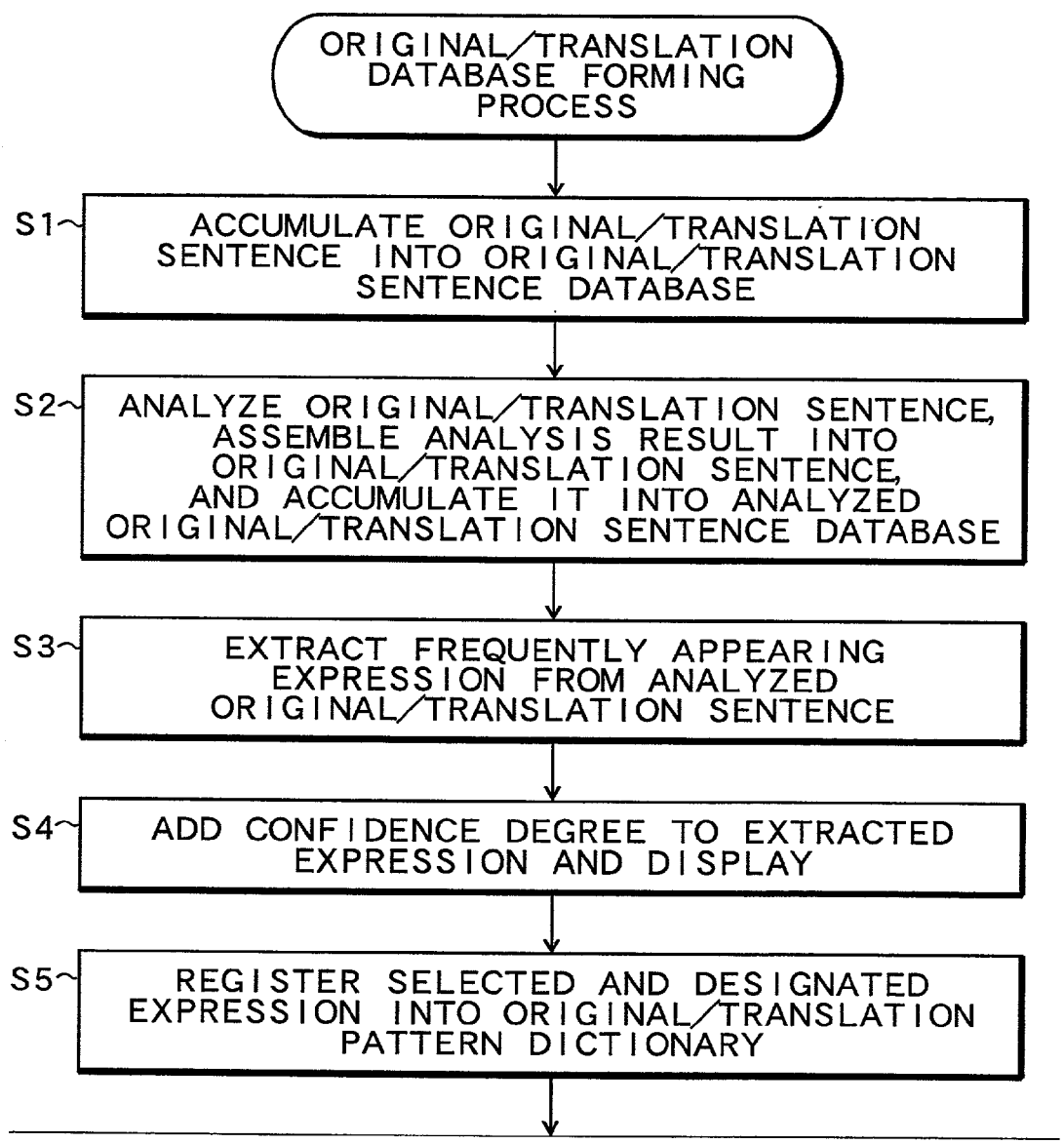
FIGS. 9A and 9B are flowcharts for the original/translation database forming process in the invention for displaying confidence degrees to the original/translation words and the original/translation patterns which are added into the dictionary of the machine translating apparatus.
Figure 9B:
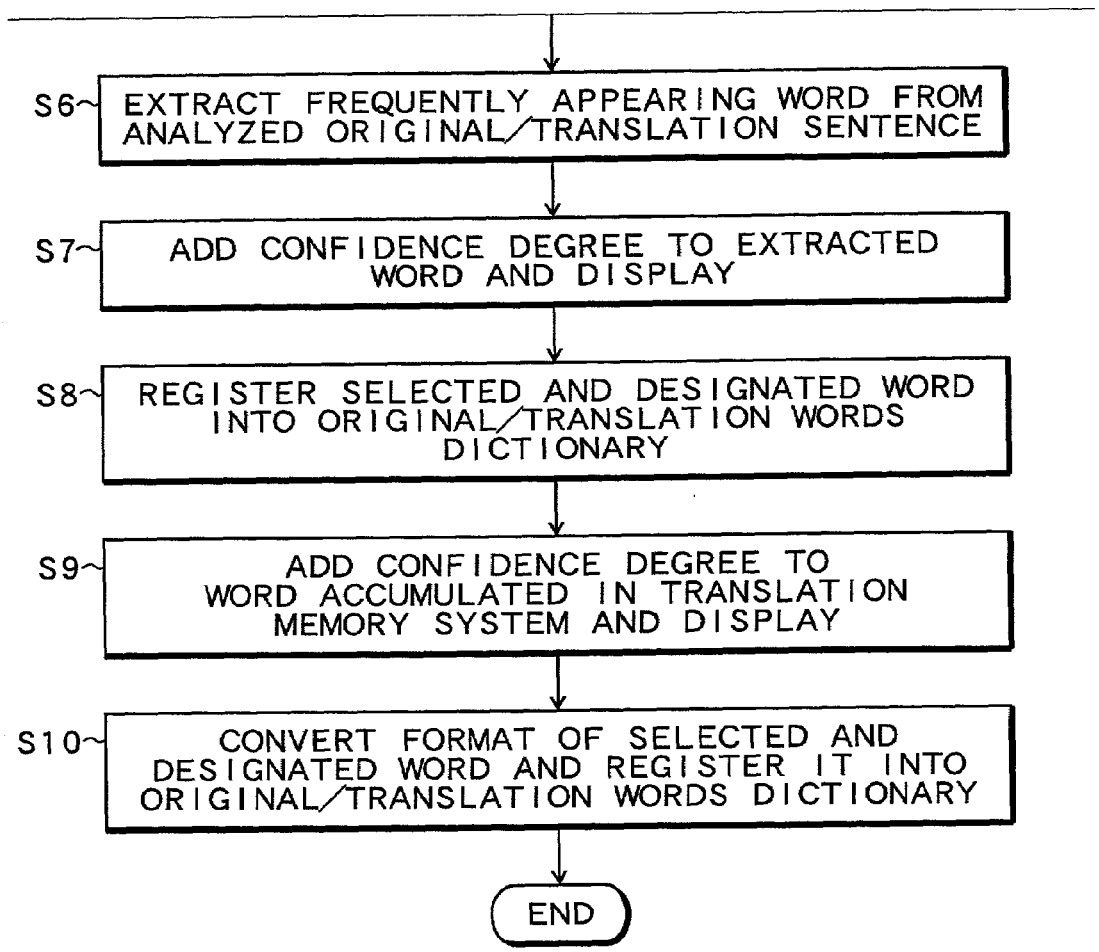

FIGS. 9A and 9B are flowcharts for another embodiment of the original/translation database forming process by the data compatible processing unit 18. This embodiment is characterized in that with respect to the expressions and original/translation patterns which frequently appear in the analyzed original/translation sentences and, further, the words in the original/translation sentence database 26 accumulated by the translation memory device, confidence degrees are added to them, the expressions, original/translation patterns, and words added with the confidence degrees are displayed to the user, respectively, and the user determines whether they are registered into the dictionary or not on the basis of the confidence degrees.

In FIGS. 9A and 9B, processes in steps S1 and S2 are the same as the original/translation database forming process in FIG. 4. When the expressions which frequently appear are extracted from the analyzed original/translation sentence in step S3, confidence degrees are added to the extracted expressions and they are displayed to the user in step S4. Therefore, the user can determine whether those expressions are registered into the original/translation pattern dictionary 32 or not with reference to the confidence degrees added to the extracted expressions. If the user instructs to register the extracted expressions on the basis of the confidence degrees, the expression whose selection has been designated is registered into the original/translation pattern dictionary 32 in step S5. Steps S6 to S8 relate to a process for registering the words extracted from the analyzed original/translation sentence into the original/translation words dictionary 34. In step S7, by adding confidence degrees to the extracted words and displaying them, the user discriminates whether those words are registered or not. If the user instructs to register them, the word whose selection has been designated is registered into the original/translation words dictionary 34 in step S8. Further, in steps S9 and S10, with respect to the words in the original/translation sentence database 26 serving as a memory side of the translation memory device 14, confidence degrees are added thereto likewise, they are displayed to the user, the user converts a format of the word whose selection has been designated and registers it into the original/translation words dictionary 34. In the case where the confidence degrees have been added to the expressions and words extracted from the analyzed original/translation sentences as mentioned above, with respect to the expressions and words whose confidence degrees are high, the process for automatically registering them into the dictionary can be also executed.

Figure 10A:
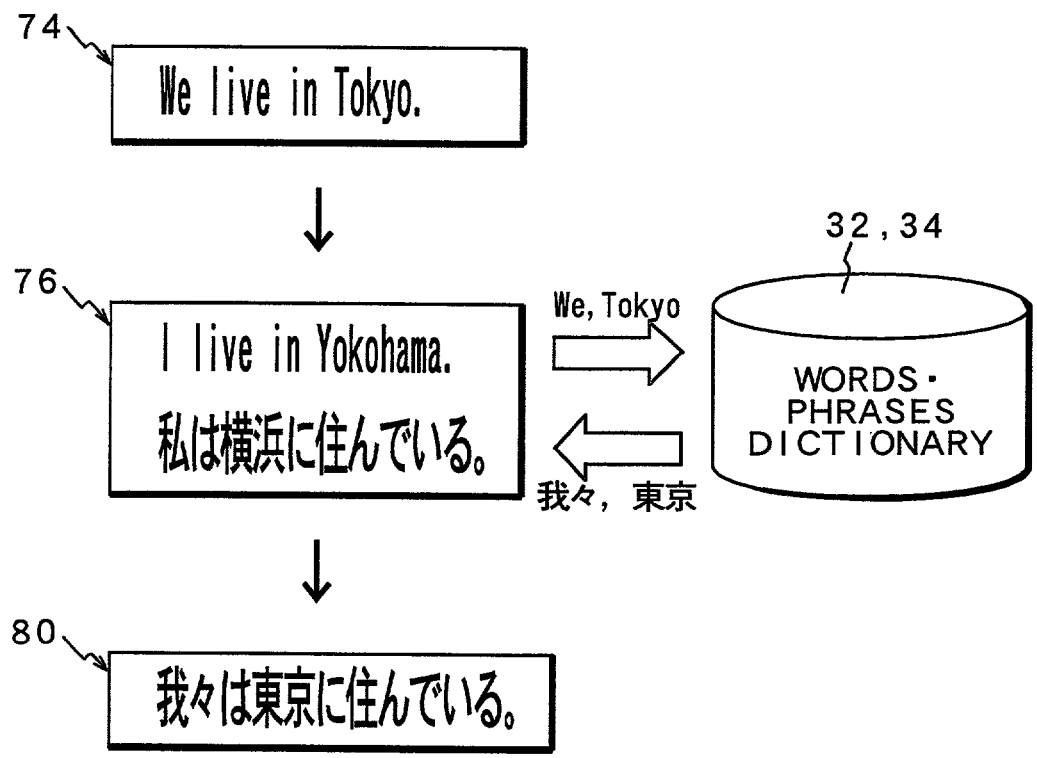
FIGS. 10A and 10B are explanatory diagrams of processing contents by a similar sentence translating unit of the invention.
Figure 10B:
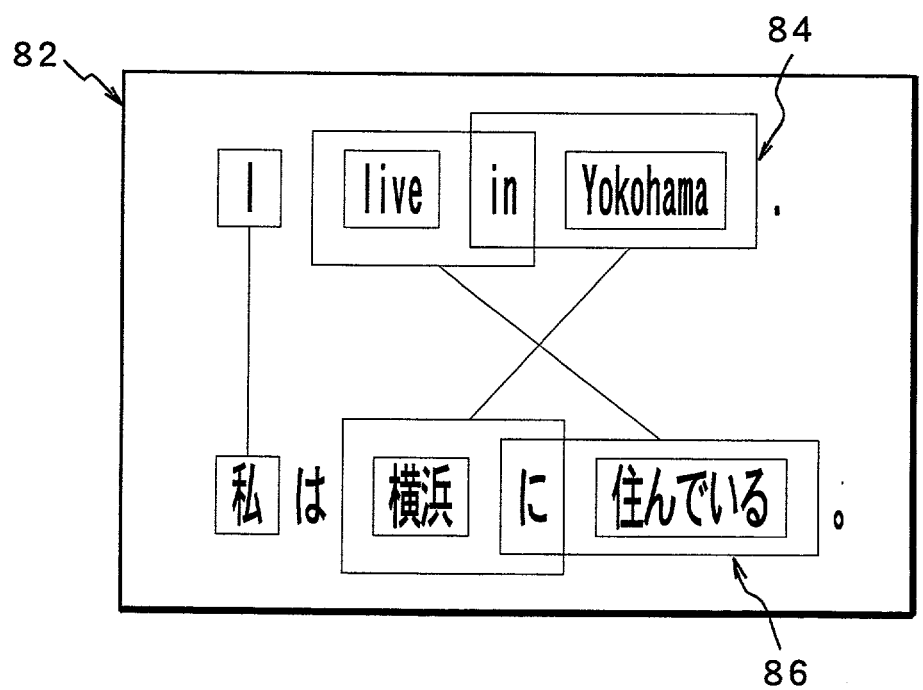

FIGS. 10A and 10B are diagrams for explaining processing contents of the similar sentence translating unit 36 in FIGS. 1A and 1B. In the similar sentence translating unit 36, for example, it is assumed that a similar sentence 76 was obtained from the original/translation sentence database 26 with reference to the original/translation database 16 by using a translation target sentence 74 as shown in FIG. 10A inputted by a translating request to the translation memory device 14 as a search key. With respect to the similar sentence 76, the analyzed original/translation sentence is obtained by the search of the analyzed original/translation sentence database 28 at the same time. This analyzed original/translation sentence can be used as analyzed words correspondence data 82 as shown in FIG. 10B. In the analyzed words correspondence data 82, a subject, a verb, and an object in a translation target similar sentence 84 are made to correspond to a subject, a verb, and an object in a similar original/translation sentence 86 as shown by solid lines, respectively. With respect to the inputted translation target sentence 74 in FIG. 10A, since its structure is not known, the sentence 74 is sent to the machine translating apparatus 12 side and the structure of the sentence is analyzed, thereby obtaining an analyzed translation target sentence. By comparing the structure of the analyzed translation target sentence with that of the similar sentence 76 whose structure has already been analyzed, "We" and "Tokyo" can be extracted as different points serving as a difference between the translation target sentence and the translation target similar sentence. The different points "We" and "Tokyo" extracted as mentioned above are sent to the machine translating apparatus 12 and "我 ?" (this means "we") and "東 京" (this means "Tokyo") are obtained as original/translation words by searching the dictionary. With respect to "私" (this means "I") and "横浜" (this means "Yokohama") as different points of the original/translation similar sentence in the similar sentence 76, by performing a replacement for exchanging "我 ?" (this means "we") and "東 京" (this means "Tokyo") obtained as a translation result of the machine translating apparatus 12, a translated sentence 80 corresponding to the inputted translation target sentence 74 can be automatically obtained.

FIG. 11 is a flowchart for the similar sentence searching process by the similar sentence translating unit 36 in FIGS. 2A and 2B. First, in step S1, the translation target sentence whose translation has been requested is fetched into the translation memory device 14. In step S2, the original/translation sentence database 26 and analyzed original/translation sentence database 28 of the original/translation database 16 are searched by using the translation target sentence as a search key, thereby obtaining a similar sentence. Subsequently, in step S3, the translation target sentence is analyzed by the machine translating apparatus 12 and an analysis structure of the analyzed searched similar sentence is compared with that of the translation target sentence, thereby extracting the different points. In step S5, the words extracted as different points are translated by looking up the dictionary of the machine translating apparatus 12. Finally, in step S6, a replacement for exchanging the different portion of the similar sentence original/translation sentence with a translation result obtained by looking up the dictionary of the machine translating apparatus 12 is performed and the translation result is outputted and displayed.

Figure 12A:
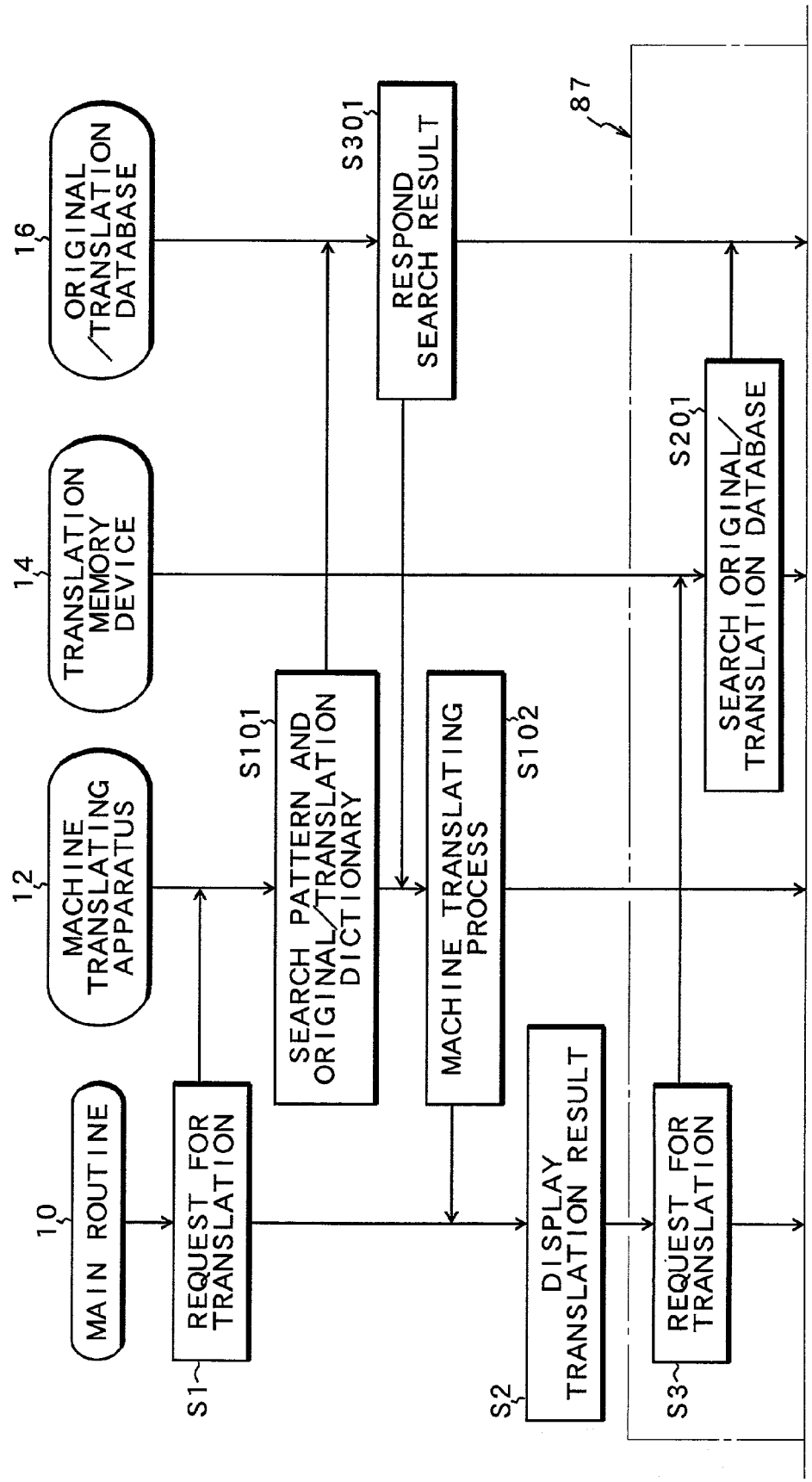
Figure 12B:
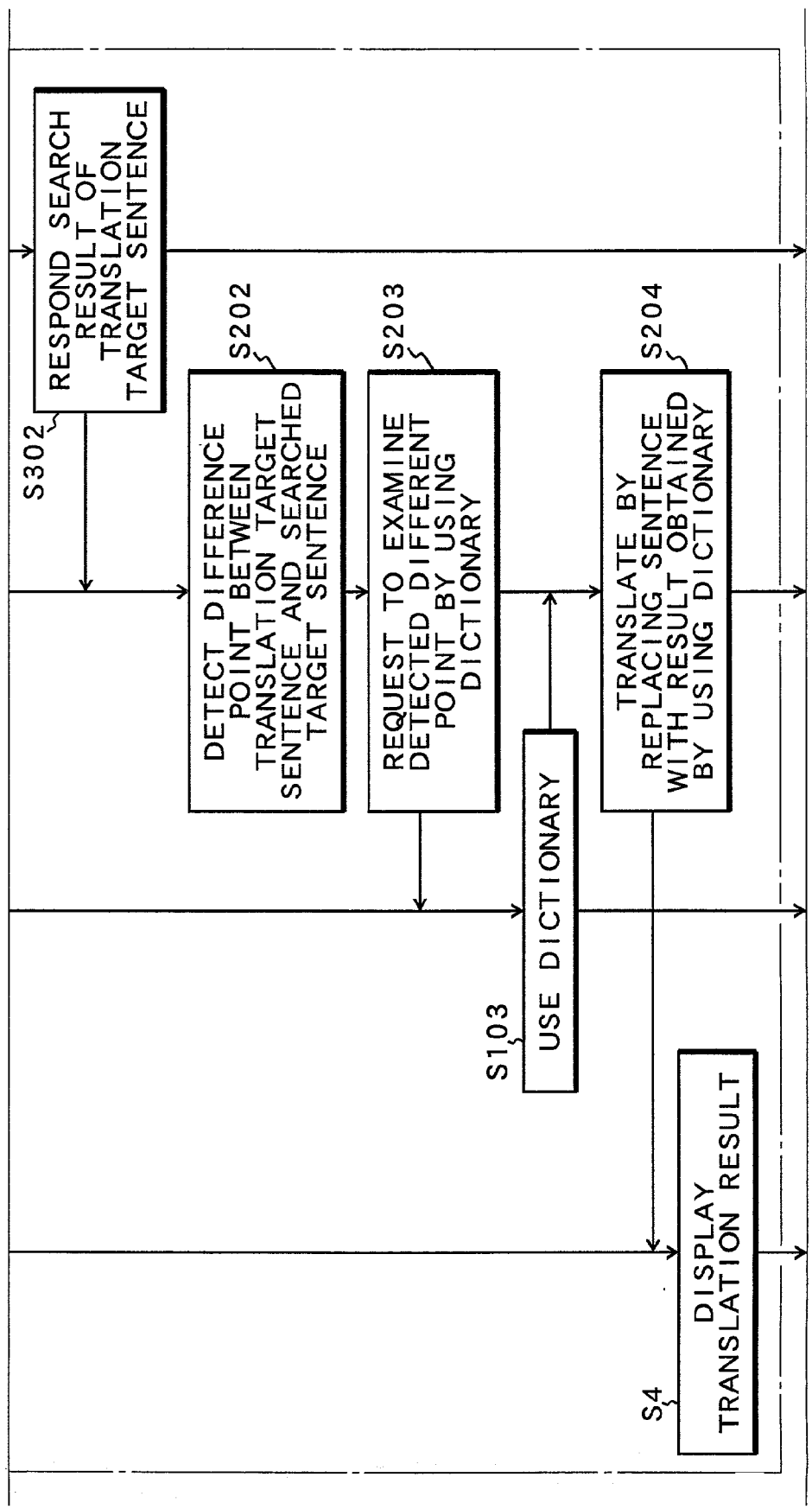

FIGS. 12A to 12C are time charts for the processing operation in the case where a translating request is issued to the machine translating apparatus 12 and translation memory device 14 in the translation supporting apparatus according to the invention in FIGS. 1A and 1B with respect to the same translation target document. The I/F unit 10 operates as a main routine for performing the whole control administration of the translation processing operation. That is, since the I/F unit 10 is provided, for example, as a translating work picture plane 11 as shown in FIGS. 2A and 2B, the user executes the translating operation by using an operating function of the translation editing unit 22 on the translating work picture plane 11. Specifically speaking, in a state where the translation target document has been inputted, when the user clicks the translate button 108 of the translation editing unit 22 on the translating work picture plane 11 in FIGS. 2A and 2B, the translating request in step S1 of the main routine by the I/F unit 10 in FIG. 12A is issued to the machine translating apparatus 12 and, at the same time, the translating request in step S3 is issued to the translation memory device 14. In the time charts of FIGS. 12A to 12C, in order to separate the translating operations of the machine translating apparatus and the translation memory device, the translating requests are sequentially issued, thereby enabling responses to them to be obtained. However, actually, the machine translating apparatus 12 and the translation memory device 14 operate in parallel in response to the translating requests in steps S1 and S3 which were issued at the same time and return the translation results. When the translating request in step S1 is sent to the machine translating apparatus 12, in step S101, with respect to the expressions and words obtained by analyzing the structure of the translation target sentence, the search of the original/translation pattern dictionary 32 and original/translation words dictionary 34 is executed to the original/translation database 16. On the original/translation database 16 side, in step S301, a result of the dictionary search is responded to the machine translating apparatus 12. On the basis of it, the machine translating apparatus 12 executes a machine translation of the translation target sentence in step S102 and sends a translation result to the I/F unit 10. In step S2, the translation result by the machine translation is displayed. In step S3, a translating request regarding the same translation target sentence is issued to the translation memory device 14 and the translation memory device 14 issues a searching request to the original/translation sentence database 26 and analyzed original/translation sentence database 28 provided for the original/translation database 16 by using the translation target sentence as a search key in step S201. In response to the searching requests, the original/translation database 16 responds search results of the original/translation sentence database 26 and analyzed original/translation sentence database 28 to the translation memory device 14 in step S302. Assuming that the response result from the original/translation database 16 indicates the similar sentence, in step S202, different points between the translation target sentence and the search target sentence are compared on the basis of the results of the structure analyses, thereby detecting the different points. In this case, in the machine translating process in step S102, since the analysis result of the structure regarding the translation target sentence has already been obtained, there is no need to request again the machine translating apparatus 12 to analyze the structure. In step S203, the machine translating apparatus 12 is requested to look up the dictionary in order to extract the words serving as a different point detected by the comparison. In step S103, the dictionary is looked up and the result is returned to the translation memory device 14. In response to it, the translation memory device 14 replaces the original/translation sentence corresponding to the different points with the result of the look-up of the dictionary and a translation is performed in step S204. The translation result is sent to the I/F unit 10. In step S4, the translation result by the translation memory device 14, in this case, the translation result by the similar sentence translating unit 36 is displayed. Therefore, the processes in the portion surrounded by a block 87 shown by an alternate long and short dash line in a range from the translating request in step S3 to the display of the translation result in step S4 correspond to the processes by the similar sentence translating unit 36 in FIGS. 1A and 1B. In step S5, the user corrects the translation result by the machine translating apparatus 12 in step S2 and, if the translation is determined, the machine translating apparatus 12 is notified of the corrected and determined translation result. In step S104, an updating request for the original/translation database is issued to the original/translation database 16. In response to the updating request, in the original/translation database 16, the original/translation database 16 is updated in step S303. Specifically speaking, the expressions and words are extracted on the basis of the analyzed original/translation sentence of the translation result and registered into the original/translation pattern dictionary 32 and original/translation words dictionary 34. The determined original/translation sentence is added into the original/translation sentence database 26 and the analyzed original/translation sentence is further registered into the analyzed original/translation sentence database 28. If a request to add the translation result obtained in step S4 into the memory is issued by the user in step S6 of the I/F unit 10, the adding request is issued to the translation memory device 14. In step S205, an updating request is issued to the original/translation database 16. In response to the updating request, in the original/translation database 16, the original/translation sentence is added into the original/translation sentence database 26 and the analyzed original/translation sentence is added into the analyzed original/translation sentence database 28. Further, the data formats of the expressions and words extracted from the original/translation sentence whose structure has already been analyzed are converted by the data compatible processing unit 18 and the converted expressions and words are registered into the original/translation pattern dictionary 32 and original/translation words dictionary 34 of the machine translating apparatus 12, thereby updating the original/translation database 16.

Figure 13:
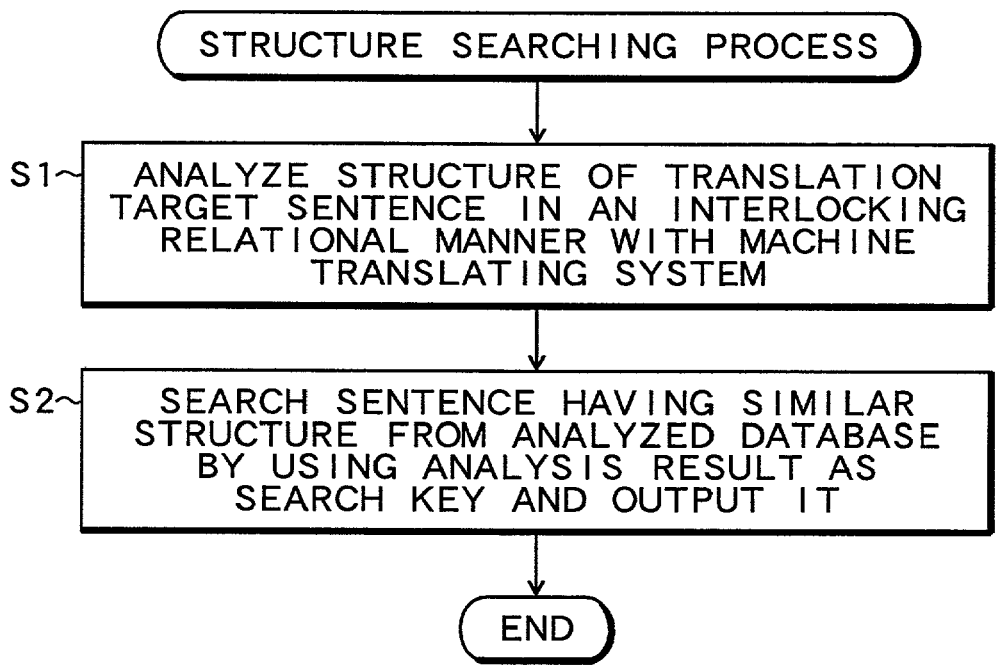
FIG. 13 is a flowchart for a structure searching process in the invention.

FIG. 13 is a flowchart for the structure searching process by the structure searching unit 38 provided for the translation supporting apparatus according to the invention in FIGS. 1A and 1B. The structure searching unit 38 supports the translating function of the translation memory device 14. That is, in the case where a similar sentence is searched from the original/translation database 16 by the translation memory device 14 by using the translation target sentence as a search key, a sentence such that although its structure is close, it is not analogous as a surface-layer-like character train cannot be searched. In the structure searching unit 38, therefore, the inputted translation target sentence is sent to the machine translating apparatus 12, its structure is allowed to be analyzed, the analyzed translation target sentence is obtained, the analyzed original/translation sentence database 28 in the original/translation database 16 is also searched by using the analyzed translation target sentence as a search key, so that a sentence having similar structures can be searched and outputted from the original/translation database 16. Thus, a sufficient depth of the matched sentence in the search of the original/translation database of the translation memory device 14 can be assured.

In the processes in FIG. 13 of the structure searching unit 38, first, in step S1, the structure of the translation target sentence is analyzed by interlocking with the machine translating apparatus. In step S2, an analysis result is used as a search key, a sentence having similar structures is searched from the analyzed original/translation sentence database, outputted to the I/F unit 10, displayed, or provided as a similar sentence to the similar sentence translating unit 36, and the unit 36 is enabled to translate the similar sentence.

Figure 14:
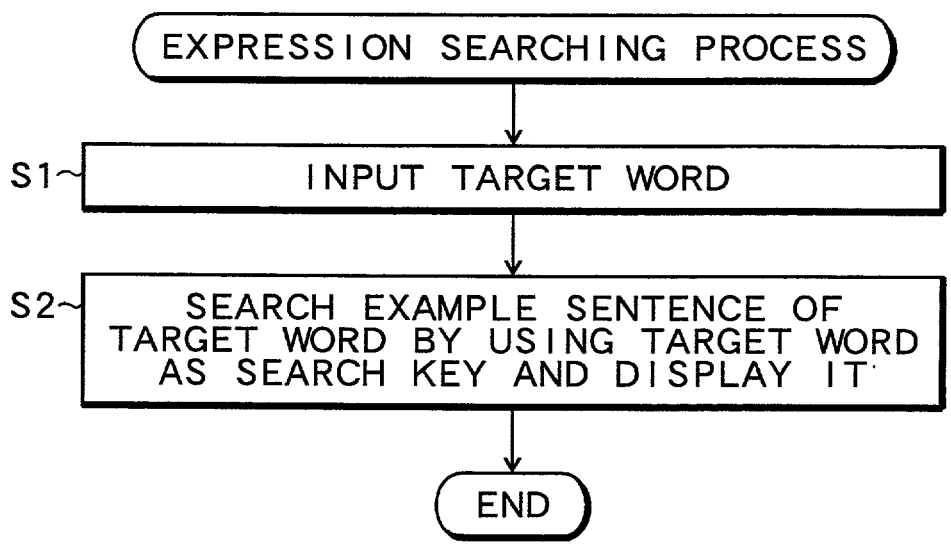
FIG. 14 is a flowchart for an expression searching process in the invention.

FIG. 14 is a flowchart for the processes by the expression searching unit 40 in FIGS. 1A and 1B. In the expression searching process, when a target word which needs to be searched is inputted in step S1, the original/translation database 16 is searched by using the inputted target word as a search key and an original sentence including the target word and its original/translation sentence are searched and displayed to the I/F unit 10. In this case, in step S2, it is also possible to further transmit the target word as a search key to the Internet 45 and search an example sentence including such a word or an expression. According to the function of the expression searching unit 40, for example, if a certain English sentence is translated into a Japanese sentence, in the case where a correct translation result cannot be obtained even if it is searched by the translation memory device 14 or translated by the machine translating apparatus 12, it will be understood that the translation result is wrong. However, if the user cannot understand how to translate the expression shown by the translation target English sentence, since an example sentence is displayed by the search by the expression searching unit 40, the translating work efficiency can be improved.

FIG. 15 is an explanatory diagram of display contents by the confidence degree setting unit 42 in FIGS. 1A and 1B. In the translation memory device 14 in FIGS. 1A and 1B, a confidence degree regarding a translation result is displayed all together with respect to the translation result. On the other hand, no confidence degree is displayed in the machine translating apparatus 12. Therefore, if a translating request regarding the same translation target sentence is issued to both of the translation memory device 14 and machine translating apparatus 12 from the I/F unit 10, when two translation results are displayed in parallel as translation results, the confidence degree has been displayed with respect to the translation result of the translation memory device 14. However, since no confidence degree is displayed with respect to the translation result of the machine translating apparatus 12, the user is confused to determine which one of the translation results he should select. Therefore, the confidence degree setting unit 42 adds a confidence degree to the translation result of the machine translating apparatus 12 and it is displayed. With respect to a translation target sentence 88, subsequent to a symbol "MT" indicative of the machine translation regarding a translation result 92 of an output display unit 90 obtained by the machine translating apparatus 12, 100% is provided as a confidence degree added by the confidence degree setting unit 42, and the original/translation sentence is displayed after that. The output display unit 90 shows 78% and 42% as confidence degrees after a symbol "TM" showing the memory translation regarding translation results 94 and 96 obtained by the translation memory device 14. The target sentences and the original/translation sentences are displayed after those values. As mentioned above, even in the case where the result of the machine translation and the translation result by the translation memory exist mixedly in the output display unit 90, since the confidence degree is added by the confidence degree setting unit 42 with respect to the translation result 92 of the machine translation, the user can properly select the best translation result among the translation candidates by looking at the confidence degrees with respect to both translation results and determine it.

FIG. 16 is an explanatory diagram of the display contents by the outline calculating unit 46 in FIGS. 1A and 1B. In the outline calculating unit 46, with respect to the translation target document 15 as a target, in this embodiment, words, expressions, and further, a matching ratio on the translation memory device 14 side are calculated and displayed. In a list 100 of frequently appearing words, the calculated words are displayed as a list in the ascending order from the high appearing frequency. In a list 102 of frequently appearing expressions, the expressions are displayed as a list in the ascending order from the high appearing frequency by the same format as that of the original/translation pattern. Further, as a matching ratio 104 in the translation memory, the numbers of matched sentences in the translation target document and the matching ratios are displayed as a list in the ascending order from the high matching ratio. The user sees the display contents on a display unit 98 by the outline calculating unit 46 of the invention, so that he can soon understand to which words or expressions attention should be paid previously with respect to the translation target document and he translates the sentence. The translation result in case of using the translation memory device 14 can be also presumed from the matching ratios. The translating work or the like using both or either one of the machine translating apparatus 12 and translation memory device 14 can be properly selected.

Figure 17A:
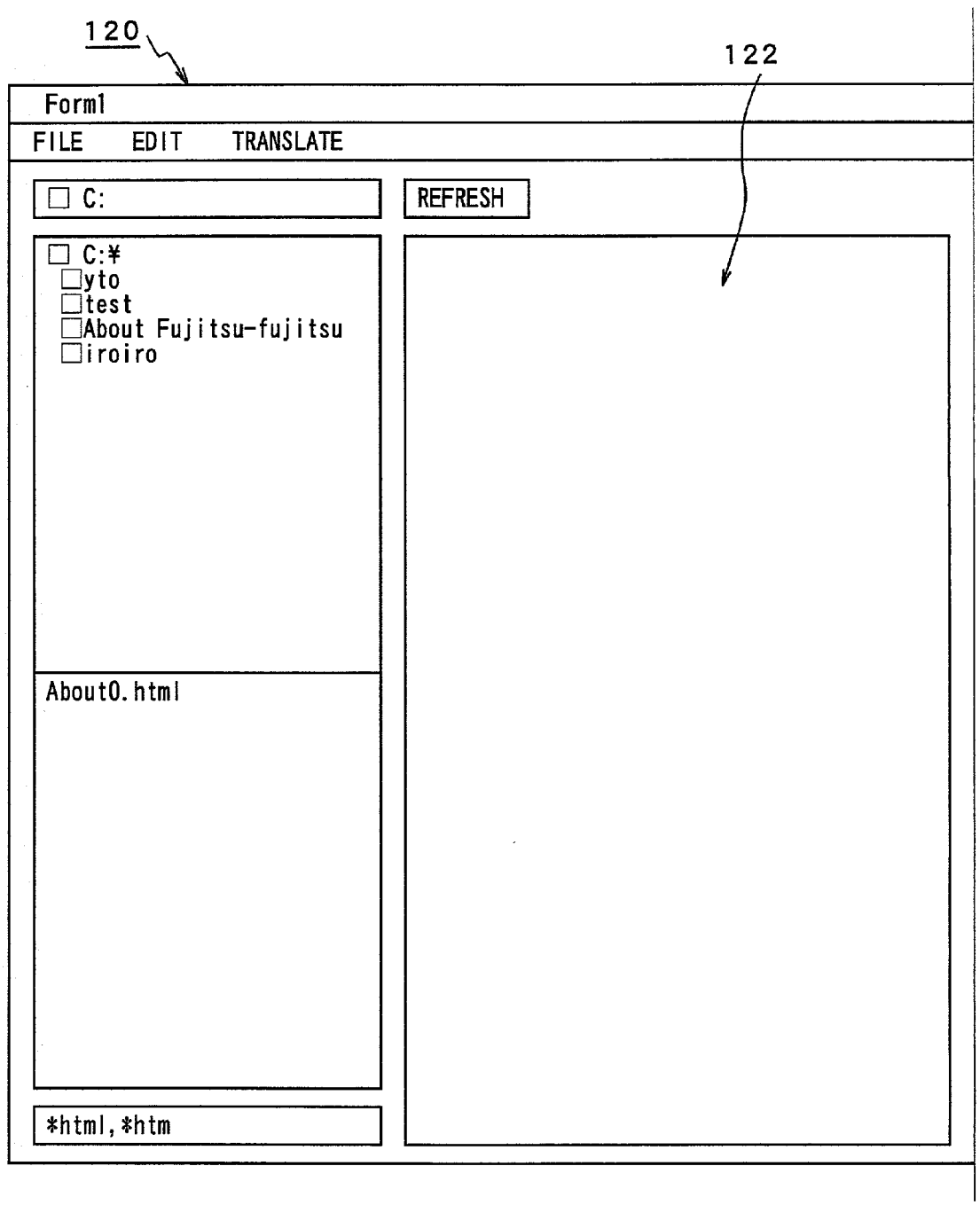
FIGS. 17A and 17B are explanatory diagrams of another embodiment of a translating work picture plane which is provided by an interface unit of the invention.
Figure 17B:
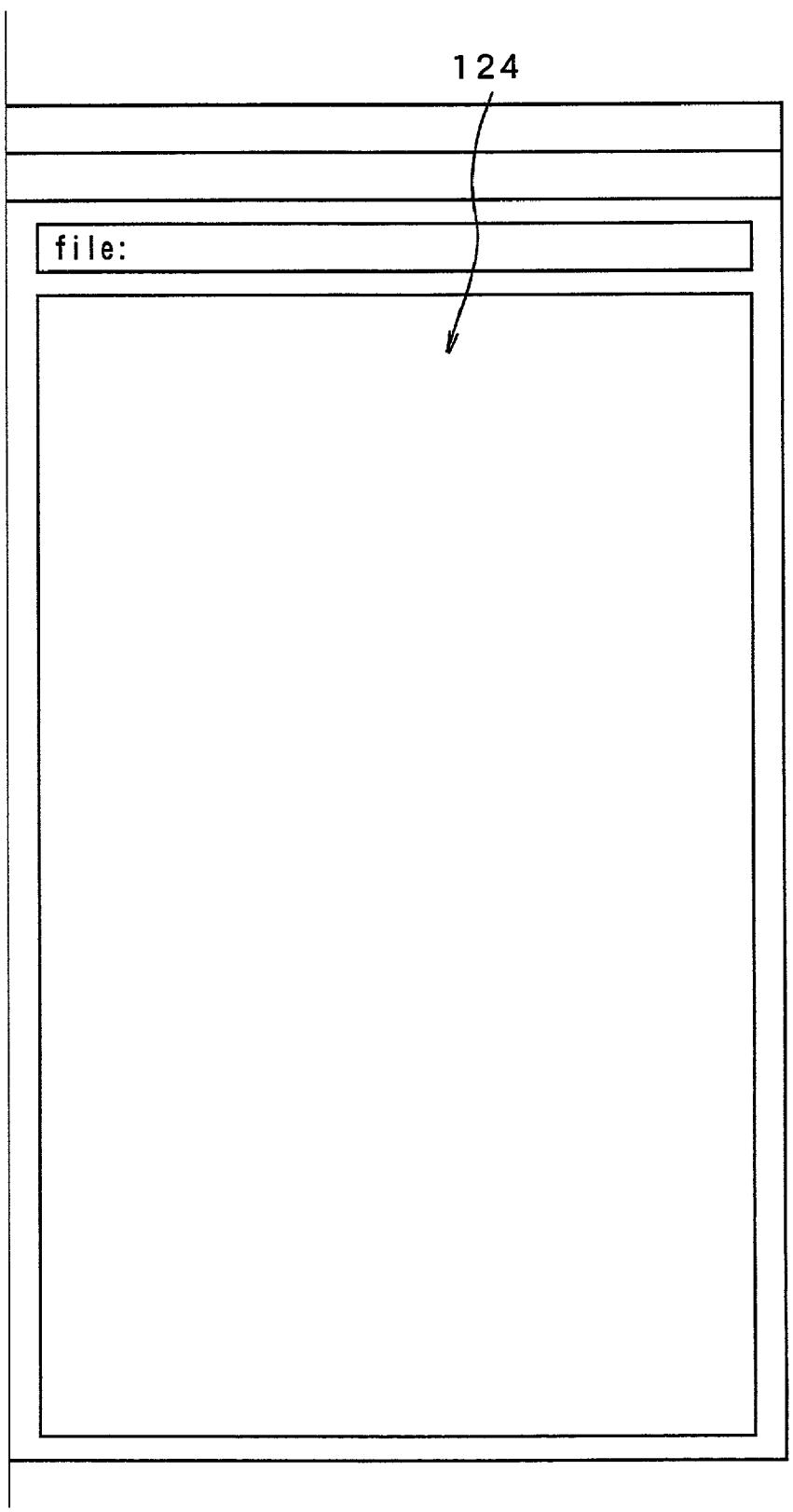

FIGS. 17A and 17B are explanatory diagrams of another embodiment of the translating work picture plane which is used as an I/F unit 10 of the invention. In a translating work picture plane 120, an original sentence display unit 124 and a translation editing unit 122 are provided and the translating work can be progressed by using the translation editing unit 122.

Figure 18A:
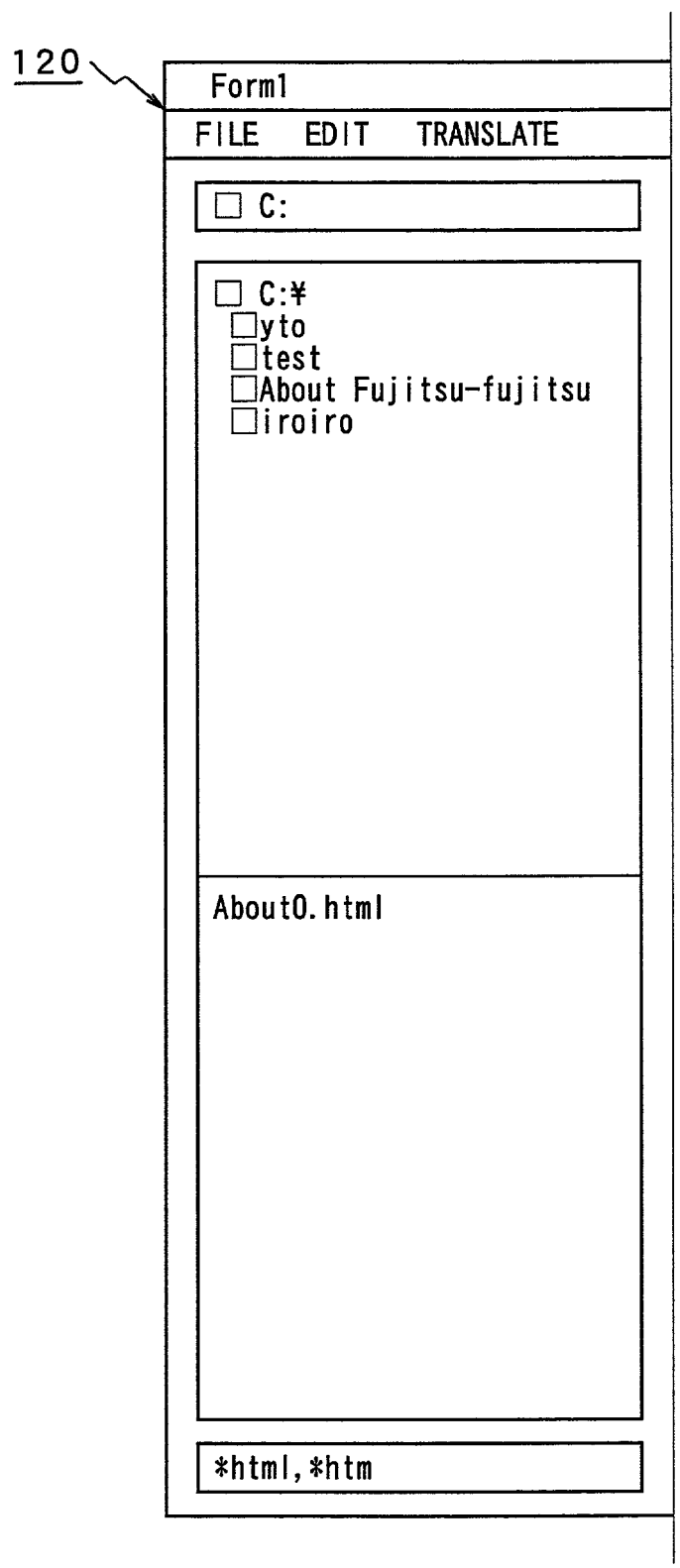
Figure 18C:
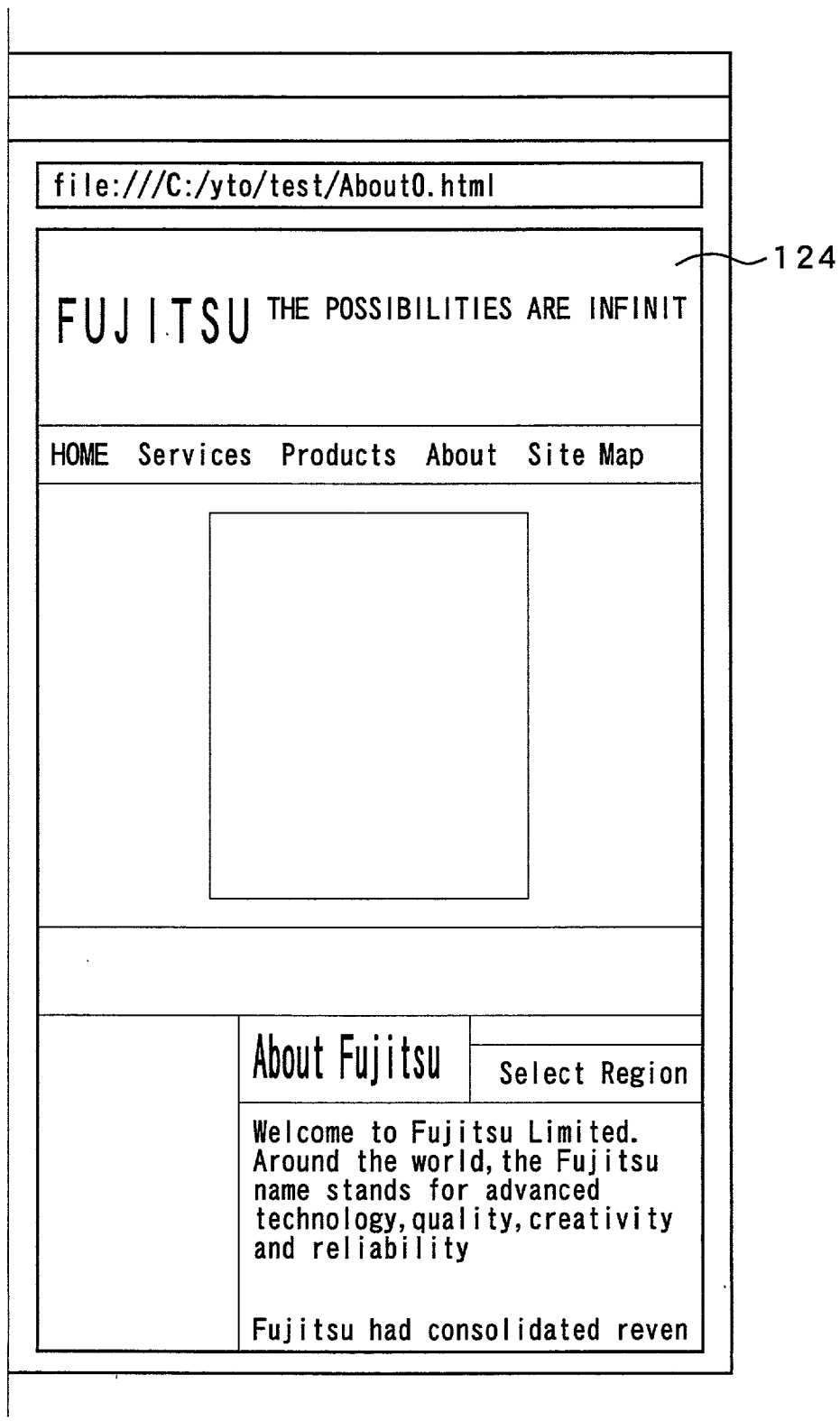

FIGS. 18A to 18C show an example showing a screen during the work of the translating work picture plane 120. A translation target document is displayed on the original sentence display unit 124 and the translation target document whose structure has been analyzed is displayed on the translation editing unit 122. With respect to the display on the translation editing unit 122, for example, when the user designates a translating position as shown in, for example, an inverting unit 126, confidence degrees and a plurality of translation results are displayed in a translation window 128. For example, by selecting the translation result of the confidence degree 100%, the user executes the translation while progressing the editing work. The translating work picture plane is not limited to that in the embodiment but the optimum picture plane construction can be also formed as a proper user interface as necessary.

The invention provides a translation supporting program. Since the machine translating apparatus 12 and translation memory device 14 in FIGS. 1A and 1B operate as independent programs, an embodiment of such a program is realized as a program for realizing the flowchart for the original/translation database forming process in FIG. 4 and the flowchart for the similar sentence translating process in FIG. 11 using the other data compatible processing unit 18 and similar sentence translating unit 36 as fundamental units. The following programs can be also further added as supporting programs to the translation supporting program as necessary: that is, a program for realizing the function of the structure searching unit 38; a program for realizing the function of the expression searching unit 40; a program for realizing the function of the confidence degree setting unit 42; a program for realizing the function of the abstract forming unit 44; and a program for realizing the function of the outline calculating unit 46 in FIGS. 1A and 1B.

According to the invention as mentioned above, the original/translation information obtained by the machine translating apparatus is reflected to the original/translation database which is used by the translation memory device, at the same time, the original/translation information accumulated in the original/translation database of the translation memory device is reflected to the machine translating apparatus, and each original/translation information can be used as common resources. Therefore, the automatization of the translating work is further progressed and the high working efficiency can be realized and the translation quality can be improved.

Even if a search result of a similar sentence such that at least one word differs as a translation result of the translation memory device is obtained as a translation result, the correct translation result which was searched and automatically corrected by interlocking with the machine translating apparatus is obtained. Therefore, the efficiency of the translating work using the translation memory device can be improved. Since the translation result is reflected to the machine translating apparatus, the higher efficient translation can be realized.

The present invention is not limited to the foregoing embodiment but incorporates many modifications without losing the objects and advantages of the invention. The present invention is not limited by the numerical values shown in the foregoing embodiment.

What is claimed is:

1. A translation supporting apparatus, comprising:
    an interface unit which issues input and output instructions regarding an input of a translation target document, an output of a translated document, and a translation control;
    a machine translating apparatus which translates a document in a certain language into a document in another language;
    an original/translation database in which original/translation information has been accumulated;
    a translation memory device which supports work for translating a document in a certain language into a document in another language by searching said original/translation database; and
    a data compatible processing unit which makes the original/translation information translated by said machine translating apparatus and the original/translation information translated by said translation memory device common and enables those information to be mutually fetched as original/translation information, said data compatible processing unit extracts the original/translation words or original/translation patterns from said analyzed original/translation sentences, and adds them into a dictionary of said machine translating apparatus;
    wherein said original/translation database has:
    an original/translation sentence database which is used by said translation memory device;
    an analyzed original/translation sentence database in which original/translation sentences have been analyzed by a morpheme analysis or a syntax analysis; and
    a dictionary in which original/translation words and original/translation patterns which are used by said machine translating apparatus have been registered and said data compatible processing unit:
        adds the original/translation sentences obtained by said machine translating apparatus or sentences obtained by correcting the original/translation sentences obtained by said translation memory device into said original/translation sentence database;
        adds the original/translation sentences obtained by said translation memory device or original/translation sentences translated by the user into said original/translation sentence database; and
        adds analyzed original/translation sentences obtained by analyzing the original/translation sentences into said analyzed original/translation sentence database.

2. An apparatus according to claim 1, wherein said data compatible processing unit further adds confidence degrees to original/translation word candidates or original/translation pattern candidates which were automatically extracted from said analyzed original/translation sentences and allows said candidates with the confidence degrees to be displayed.

3. An apparatus according to claim 1, further comprising;
    a confidence degree setting unit constructed in a manner such that when a sentence is simultaneously translated by said translation memory device and said machine translating apparatus, with respect to an output display of translation candidates added with marks indicative of confidence degrees from said translation memory device, marks indicative of confidence degrees are added to translated sentence candidates outputted from said machine translating apparatus, and said candidates with the marks are displayed.

4. An apparatus according to claim 1, further comprising an outline calculating unit which calculates document information including the number of characters, the number of words, expressions, and the like of the translation target document and allows them to be displayed in order of appearance frequencies.

5. A translation supporting method, comprising:
    translating a document in a certain language into a document in another language by a machine translating apparatus;
    translating a document in a certain language into a document in another language by a translation memory device by searching an original/translation database in which original/translation information has been accumulated; and
    making the original/translation information translated by said machine translating apparatus and the original/translation information translated by said translation memory device common so that data is compatible and mutually fetching those information as original/translation information; and
    extracting original/translation words or original/translation patterns from analyzed original/translation sentences and adding them into a dictionary of said machine translating apparatus;

wherein said original/translation database has:
an original/translation sentence database which is used by said translation memory device; an analyzed original/translation sentence database in which original/translation sentences have been analyzed by a morpheme analysis, a syntax analysis, or the like; and
a dictionary in which original/translation words and original/translation patterns which are used by said machine translating apparatus have been registered, said original/translation sentences obtained by said machine translating apparatus or sentences obtained by correcting the original/translation sentences obtained by said translation memory device are converted into compatible data and added into said original/translation sentence database;
the original/translation sentences obtained by said translation memory device or original/translation sentences translated by the user are added into said original/translation sentence database, and analyzed original/translation sentences obtained by analyzing the original/translation sentences are added into said analyzed original/translation sentence database.

6. A method according to claim 5, wherein confidence degrees are further added to original/translation word candidates or original/translation pattern candidates which were automatically extracted from said analyzed original/translation sentences and said candidates with the confidence degrees are displayed.

7. A method according to claim 5, wherein when a sentence is simultaneously translated by said translation memory device and said machine translating apparatus, with respect to an output display of translation candidates added with marks indicative of confidence degrees from said translation memory device, marks indicative of confidence degrees are further added to the translated sentence candidates outputted from said machine translating apparatus and said candidates with the marks are displayed.

8. A method according to claim 5, wherein document information including the number of characters, the number of words, and expressions of a translation target document is further calculated and they are displayed in order of appearance frequencies.

9. A computer-readable medium including computer program instructions stored therein, wherein said computer program instructions allow the computer to execute:
translating a document in a certain language into a document in another language by a machine translating apparatus;
translating a document in a certain language into a document in another language by a translation memory device by searching an original/translation database in which original/translation information has been accumulated;
making the original/translation information translated by said machine translating apparatus and the original/translation information translated by said translation memory device common so that data is compatible and mutually fetching said information as original/translation information; and
extracting original/translation words or original/translation patterns from analyzed original/translation sentences and adding them into a dictionary of said machine translating apparatus;
converting original/translation sentences obtained by said machine translating apparatus into compatible data and adding them into an original/translation sentence database;
adding original/translation sentences obtained by said translation memory device or original/translation sentences translated by the user into said original/translation sentence database and adding analyzed original/translation sentences obtained by analyzing the original/translation sentences into an analyzed original/translation sentence database.

10. A computer-readable medium according to claim 9, wherein said program instructions allow the computer to further execute the step of: adding confidence degrees to original/translation word candidates or original/translation pattern candidates which were automatically extracted from said analyzed original/translation sentences and displaying said candidates with the confidence degrees.

11. A computer-readable medium according to claim 9, wherein said program instructions allow the computer to further execute:
when a sentence is simultaneously translated by said translation memory device and said machine translating apparatus, with respect to an output display of translation candidates added with marks indicative of confidence degrees from said translation memory device, adding marks indicative of confidence degrees to the translated sentence candidates outputted from said machine translating apparatus and displaying said candidates with the marks.

12. A computer-readable medium according to claim 9, wherein said program instructions allow the computer to further execute the step of calculating document information including the number of characters, the number of words, and expressions of a translation target document and displaying them in order of appearance frequencies.

* * * * *

UNITED STATES PATENT AND TRADEMARK OFFICE
CERTIFICATE OF CORRECTION

PATENT NO. : 7,194,403 B2
APPLICATION NO. : 09/964649
DATED : March 20, 2007
INVENTOR(S) : Seiji Okura et al.

It is certified that error appears in the above-identified patent and that said Letters Patent is hereby corrected as shown below:

On the Title Page, Item (56) (Other Publications), Line 5, change "trnaslation" to --translation--.

Signed and Sealed this

First Day of September, 2009

David J. Kappos
*Director of the United States Patent and Trademark Office*